(12) United States Patent
Baba

(10) Patent No.: US 8,830,591 B2
(45) Date of Patent: Sep. 9, 2014

(54) PROJECTION LENS AND PROJECTION DISPLAY APPARATUS

(71) Applicant: FUJIFILM Corporation, Tokyo (JP)

(72) Inventor: Tomoyuki Baba, Saitama-ken (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 13/933,784

(22) Filed: Jul. 2, 2013

(65) Prior Publication Data

US 2013/0286484 A1 Oct. 31, 2013

Related U.S. Application Data

(63) Continuation of application No. PCT/JP2012/000426, filed on Jan. 24, 2012.

(30) Foreign Application Priority Data

Jan. 31, 2011 (JP) ................... 2011-017403

(51) Int. Cl.
| | |
|---|---|
| *G02B 3/00* | (2006.01) |
| *G02B 9/00* | (2006.01) |
| *G02B 13/00* | (2006.01) |
| *G02B 13/04* | (2006.01) |
| *G02B 13/22* | (2006.01) |
| *G02B 5/04* | (2006.01) |

(52) U.S. Cl.
CPC .......... *G02B 13/0015* (2013.01); *G02B 13/002* (2013.01); *G02B 5/04* (2013.01); *G02B 13/04* (2013.01); *G02B 13/22* (2013.01)
USPC .......................................................... 359/649

(58) Field of Classification Search
USPC .................. 359/649–651, 686, 783
See application file for complete search history.

(56) References Cited

U.S. PATENT DOCUMENTS

| | | |
|---|---|---|
| 5,550,679 A | 8/1996 | Sugawara |
| 5,625,495 A | 4/1997 | Moskovich |
| 5,812,326 A | 9/1998 | Yamada |
| 5,867,326 A | 2/1999 | Yamamoto |
| 5,946,144 A | 8/1999 | Yamamoto |
| 6,094,311 A | 7/2000 | Moskovich |
| 6,324,014 B1 | 11/2001 | Moskovich |
| 6,870,689 B2 | 3/2005 | Yoshida |
| 7,035,017 B2 | 4/2006 | Tadic-Galeb et al. |
| RE39,424 E | 12/2006 | Moskovich |
| RE39,911 E | 11/2007 | Moskovich |
| 2004/0109239 A1 | 6/2004 | Yoshida |
| 2004/0233540 A1 | 11/2004 | Tadic-Galeb et al. |
| 2006/0050401 A1 | 3/2006 | Tadic-Galeb et al. |
| 2010/0091249 A1 | 4/2010 | Benedix et al. |
| 2011/0242685 A1 | 10/2011 | Yamamoto |

FOREIGN PATENT DOCUMENTS

| | | |
|---|---|---|
| JP | H06-160708 | 6/1994 |
| JP | H08-320433 | 12/1996 |
| JP | H11-500834 | 1/1999 |
| JP | H11-194266 | 7/1999 |
| JP | 2000-509515 | 7/2000 |
| JP | 2001-523836 | 11/2001 |
| JP | 2004-077946 | 3/2004 |
| JP | 2007-206331 | 8/2007 |
| JP | 2009-069540 | 4/2009 |
| JP | 2010-197599 | 9/2010 |
| JP | 2010-204241 | 9/2010 |
| JP | 2011-085744 | 4/2011 |

*Primary Examiner* — Alicia M Harrington
(74) *Attorney, Agent, or Firm* — Young & Thompson

(57) ABSTRACT

A projection lens for projecting image information displayed on a reduction side conjugate position to a magnification side conjugate position, including a negative first lens group, a positive second lens group, a positive third lens group, and a positive fourth lens group arranged in this order from the magnification side, which satisfies predetermined conditional expressions.

19 Claims, 7 Drawing Sheets

← MAGNIFICATION SIDE    REDUCTION SIDE →

(A)    (B)    (C)

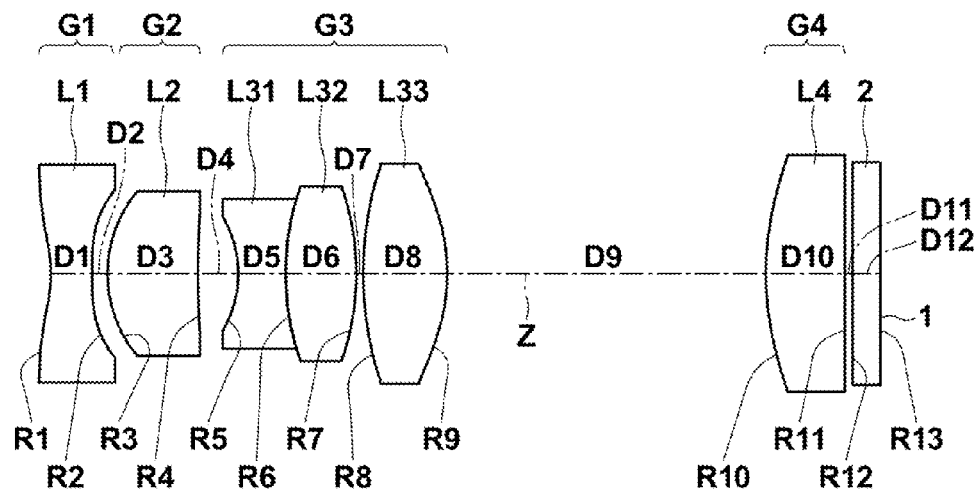
FIG.6 EXAMPLE 1
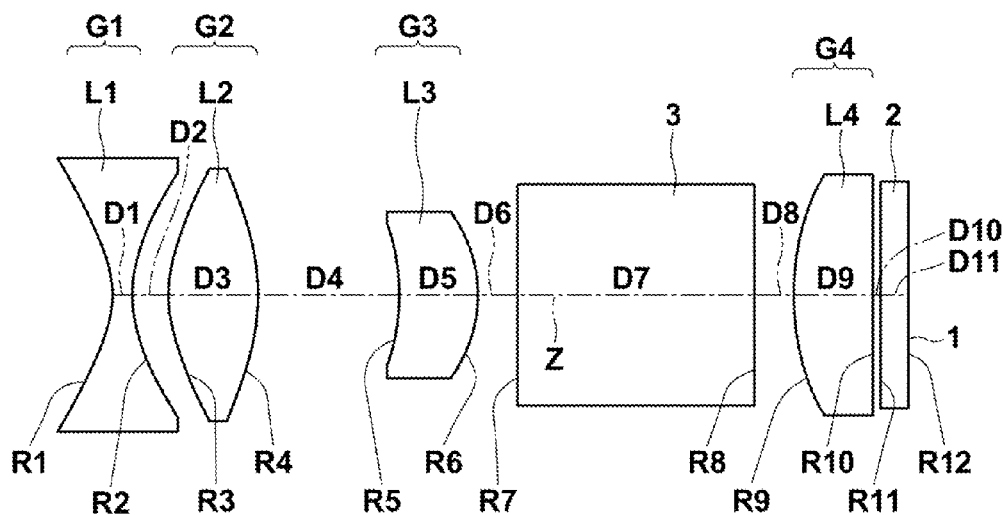
FIG.7 EXAMPLE 2

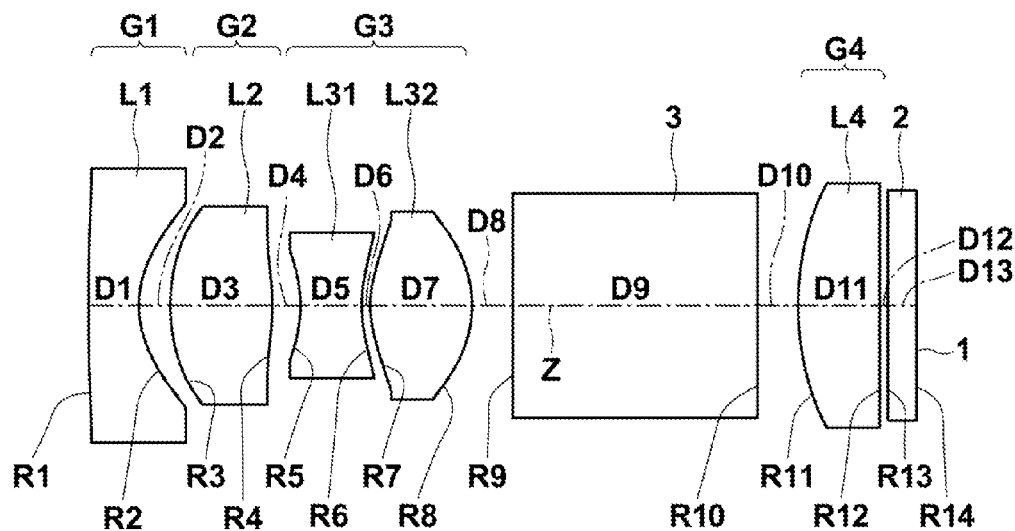
FIG.8   EXAMPLE 3
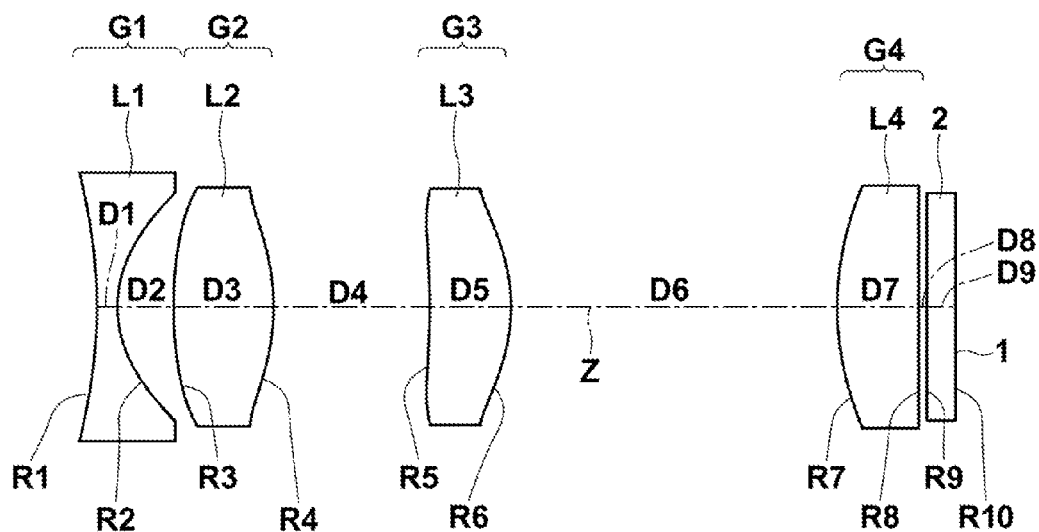
FIG.9   EXAMPLE 4

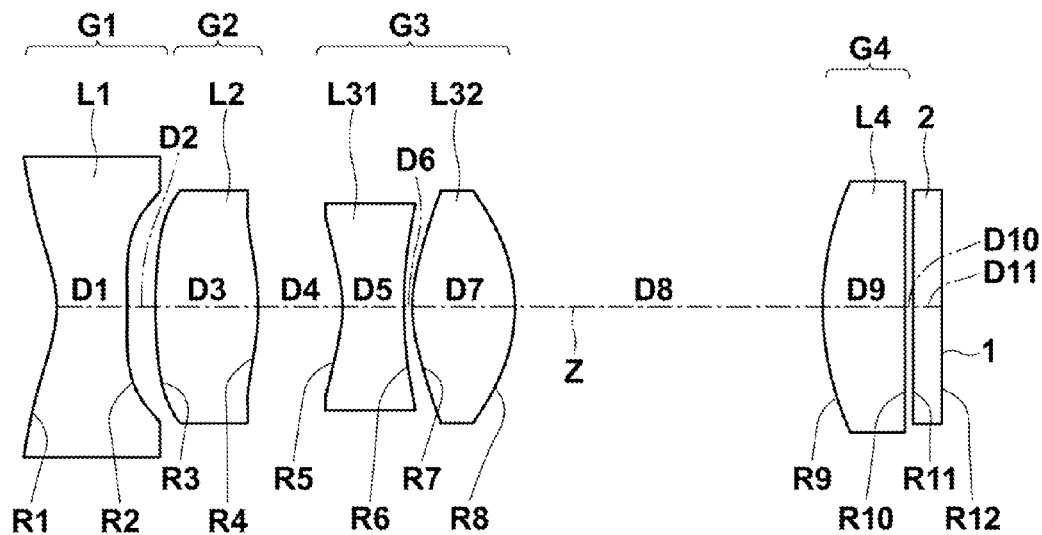
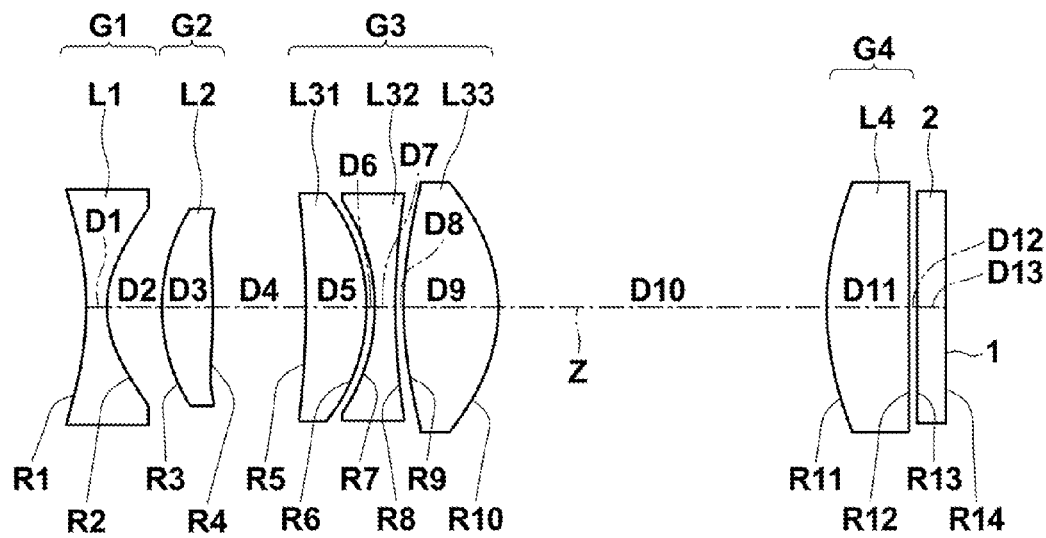

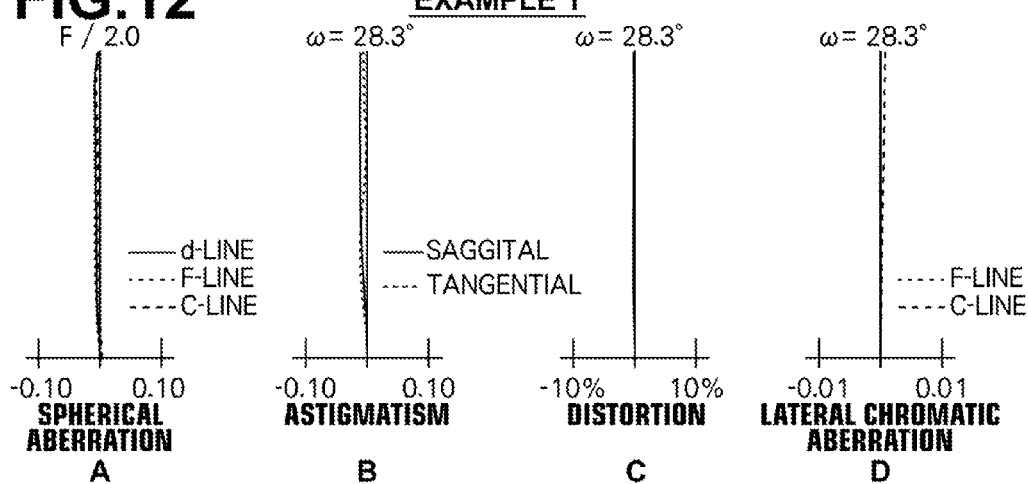
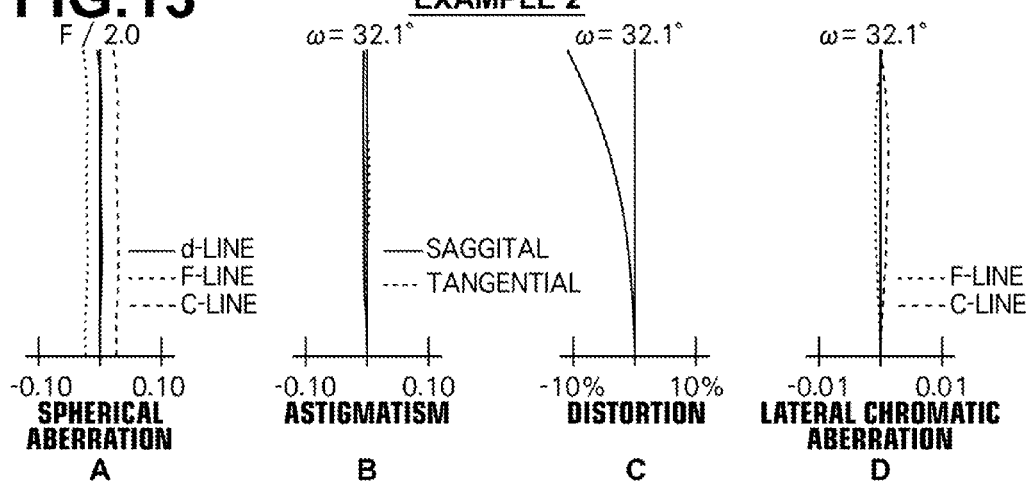
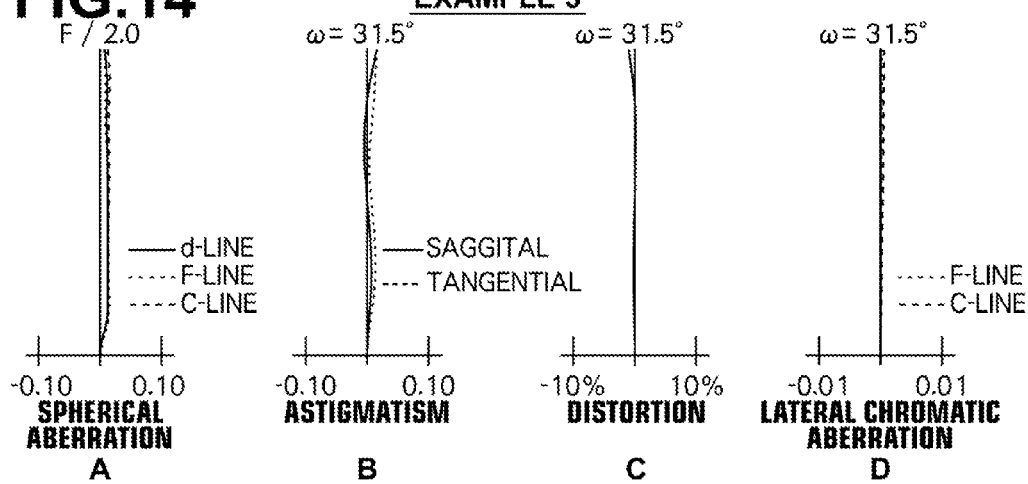

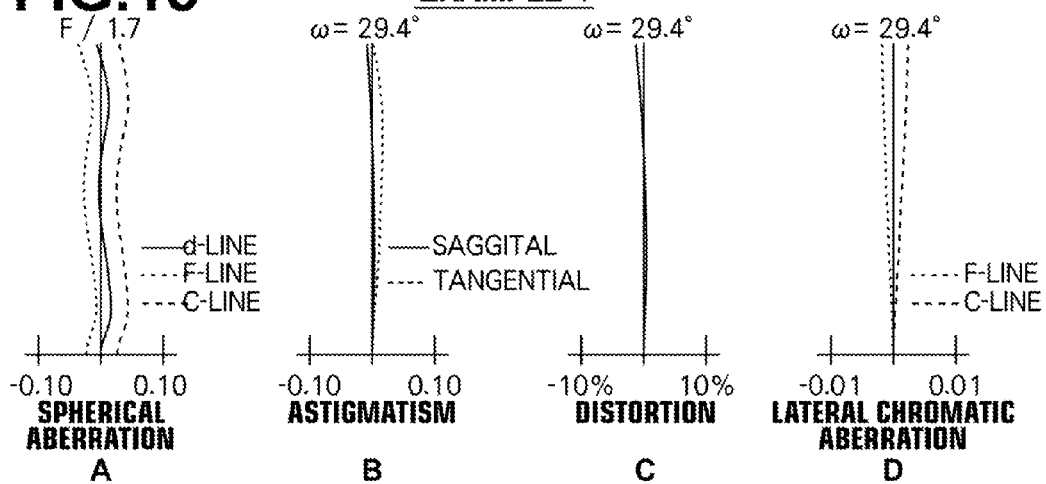
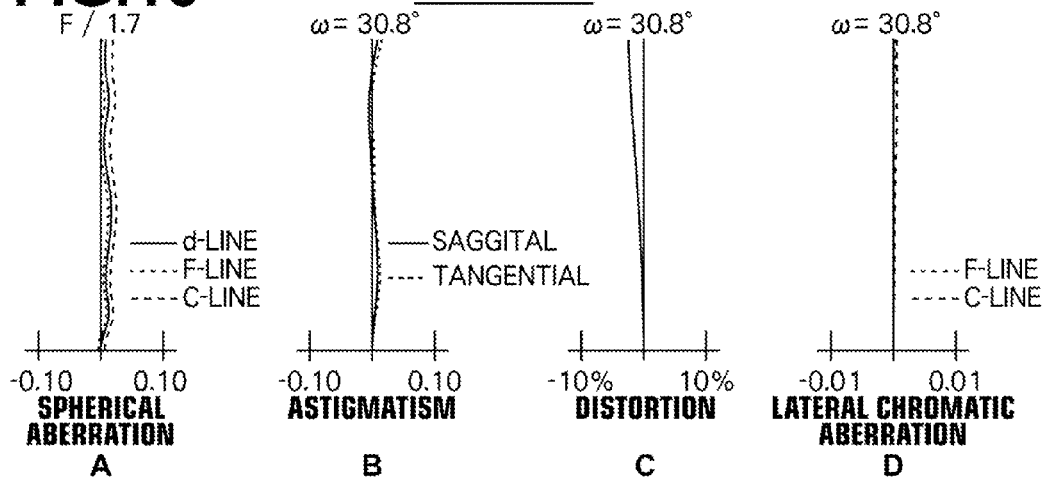
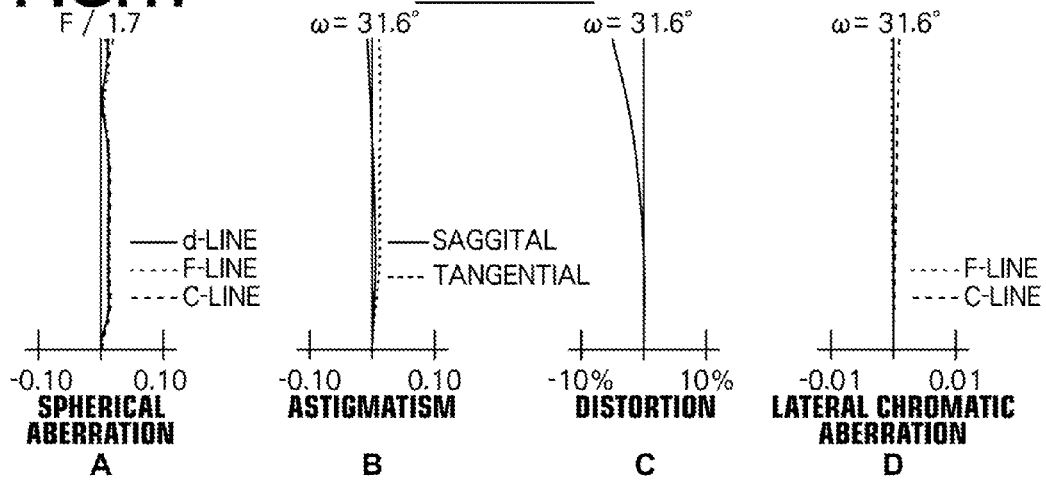

PROJECTION LENS AND PROJECTION DISPLAY APPARATUS

BACKGROUND OF THE INVENTION

This application is a continuation of WO 2012105181 published on Aug. 9, 2012, which claims foreign priority to Japanese application No. 2011-017403 filed on Jan. 31, 2011. The entire contents of each of the above applications are hereby incorporated by reference.

FIELD OF THE INVENTION

The present invention relates to a projection lens for performing enlarged projection of display information from a light valve, such as a transmissive or reflective liquid crystal display device, or DMD (Digital Micro-mirror Device: registered trade mark), and more particularly to a projection lens suitable for use with a so-called highly portable handy-type projection display apparatus and a projection display apparatus using the same.

DESCRIPTION OF THE RELATED ART

Projection display devices using a light valve, such as a liquid crystal display device or DMD display device, are widely used. With a rapid advance in downsizing and definition enhancement of light valves, together with a widespread use of personal computers, a demand for conducting business presentations using such projection display devices is increasing. Under these circumstances, in particular, a demand for a highly portable compact projection display devices has recently been increasing. Further, it is conceivable that projection display devices will be handled like cell phones or flashlights in the future and it is essential to that end to further enhance the portability.

An effective measure to respond to the demand is to reduce the size of a projection display device in a direction perpendicular to the optical axis of the projection optical system which is generally a thickness direction of the housing of the device and, for that purpose, it is important to reduce the outer diameters of all lenses of the projection lens.

As for a conventional technique in which a projection lens is downsized for the purpose of enhancing the portability of the projection display device, projection lenses which are telecentric on the reduction side and configured such that a certain amount of space is secured at the lens back for color composition, separation of illumination light from projection light, and the like are known as described, for example, in Japanese Unexamined Patent Publication No. 2007-206331 (Patent Document 1) and Japanese Unexamined Patent Publication No. 2009-069540 (Patent Document 2). Further, projection lenses which are telecentric on the reduction side and configured such that a positive lens is disposed adjacent to a reduction side conjugate position are known as described, for example, in U.S. Pat. No. 5,550,679 (Patent Document 3) and U.S. Pat. No. 5,867,326 (Patent Document 4).

BRIEF SUMMARY OF THE INVENTION

The projection lenses described in Patent Document 1 and Patent document 2 are telecentric on the reduction side and lens back is secured to a certain degree, but no active measure is taken to downsize the lenses by preventing increase in the lens size on the reduction side. Further, no active downsizing measure is taken with respect to effective luminous flux for the lenses on the magnification side as well as those on the reduction side. The projection lenses described in Patent Document 3 and Patent Document 4 require 8 to 10 lenses, so that the projection lenses need to be configured with a lesser number of lenses in order to implement downsizing of the devices and enhancing portability.

The present invention has been developed in view of the circumstances described above, and it is an object of the present invention to provide a projection lens applicable to a projection display apparatus which is excellent in portability and allows downsizing of the housing thereof, in particular, in a thickness direction, as well as having high projection performance.

A first projection lens of the present invention is a projection lens for projecting image information displayed on a reduction side conjugate position to a magnification side conjugate position, the projection lens substantially consisting of a first lens group having a negative power, a second lens group having a positive power, a third lens group having a positive power, and a fourth lens group having a positive power arranged in this order from the magnification side, wherein the projection lens satisfies conditional expressions (1) to (4) given below:

$$Bf/f \leq 1.0 \quad (1);$$

$$0.5 \leq d34/f \leq 3.0 \quad (2);$$

$$0.5 \leq YI/f \quad (3); \text{ and}$$

$$f \times d34/(YI \times YA) \leq 12.5 \quad (4),$$

where:

Bf is a back focus on the reduction side (air equivalent length);

f is a focal length of the entire system;

d34 is an air equivalent distance on the optical axis between the third lens group and fourth lens group;

YI is a maximum height of effective luminous flux at the reduction side conjugate position; and YA is a maximum height of axial luminous flux in the projection lens.

A second projection lens of the present invention is a projection lens for projecting image information displayed on a reduction side conjugate position to a magnification side conjugate position, the entire system substantially consisting of less than or equal to six lenses, which constitute:

a first lens group having a negative power, a second lens group having a positive power, a third lens group having a positive power, and a fourth lens group having a positive power arranged in this order from the magnification side, wherein the projection lens satisfies a conditional expression (2-1) given below:

$$0.7 \leq d34/f \leq 2.0 \quad (2\text{-}1),$$

where:

f is a focal length of the entire system; and d34 is an air equivalent distance on the optical axis between the third lens group and the fourth lens group on the optical axis.

Preferably, the first and second projection lenses of the present invention satisfy any one or a combination of two or more of conditional expressions (5) to (9):

$$f \times YP/(YI \times YA) \leq 3.0 \quad (5);$$

$$d13/YI \leq 7.5 \quad (6);$$

$$0.5 \leq |f1|/f \leq 2.5 \quad (7);$$

$$0.5 \leq f2/f \leq 5.0 \quad (8); \text{ and}$$

$$1.5 \leq f4/f \leq 5.0 \quad (9),$$

where:

YP is a maximum height of an off-axis principal ray in the projection lens;

YI is a maximum height of effective luminous flux at the reduction side conjugate position;

YA is a maximum height of axial luminous flux in the projection lens;

d13 is a distance on the optical axis from the surface of the first lens group on the most magnification side to the surface of the third lens group on the most reduction side;

f1 is a focal length of the first lens group;

f2 is a focal length of the second lens group; and f4 is a focal length of the fourth lens group.

Preferably, in the first and second projection lenses of the present invention, the first lens group is composed of one negative lens. Further, in the first and second projection lenses of the present invention, the first lens group has at least one aspherical surface.

Preferably, in the first and second projection lenses of the present invention, the second lens group is composed of one positive lens. Further, in the first and second projection lenses of the present invention, the second lens group has at least one aspherical surface.

Preferably, in the first and second projection lenses of the present invention, the third lens group is composed of less than or equal to three lenses. Further, in the first and second projection lenses of the present invention, the third lens group has at least one aspherical surface.

Preferably, in the first and second projection lenses of the present invention, the fourth lens group is composed of one positive lens. Further, in the first and second projection lenses of the present invention, the fourth lens group has at least one aspherical surface.

Preferably, in the first and second projection lenses of the present invention, a lens disposed on the most magnification side has a non-circular shape which includes an effective luminous flux passing area. Further, preferably, in the first and second projection lenses of the present invention, a lens disposed on the most reduction side has a non-circular shape which includes an effective luminous flux passing area.

Preferably, in the first and second projection lenses of the present invention, the reduction side is telecentric.

A projection display apparatus of the present invention includes a light source, at least one light valve, an illumination optical unit for guiding luminous flux from the light source to the light valve, and the aforementioned projection lens, wherein the luminous flux from the light source is optically modulated by the light valve and projected to a screen by the projection lens.

The term "magnification side" as used herein refers to the projected side (screen side) and the screen side is referred to as the magnification side even when reduced size projection is performed for convenience. In the mean time, the term "reduction side" as used herein refers to the original image display area side (light valve side) and the light valve side is referred to as the reduction side even when reduced size projection is performed for convenience.

The term "lens group" as used herein is not necessarily formed of a plurality of lenses and includes a lens group formed of only one lens.

The sign of the power of a lens or a lens group of the projection lens is judged in the paraxial region for those having an aspherical surface.

In the projection lens described above, the term "substantially consists of a first lens group _____, a second lens group _____, a third lens group _____, and fourth lens group _____" as used herein refers to that the projection lens includes only the aforementioned four lens groups as the lens group and may includes an optical element other than a lens group. Likewise, the term "the first lens group is composed of one negative lens" as used herein refers to that the lens group includes only one negative lens as the lens and may include an optical element other than a lens. Likewise, the terms "the second lens group is composed of one positive lens" and "the fourth lens group is composed of one positive lens" may include an optical element other than a lens.

The term "effective luminous flux" with respect to YI refers to a luminous flux used for forming an image when a luminous flux is inputted to the projection lens based on predetermined specifications. The term "axial luminous flux" with respect to YA refers to a luminous flux when an axial luminous flux is inputted to a maximum diameter based on the specifications, including the F-value, aperture stop diameter, and the like.

The term "non-circular shape" as used herein refers to that the shape of each lens is not a circle when viewed from the traveling direction of the luminous flux.

According to the first projection lens of the present invention, a four group projection lens having four lens groups of negative, positive, positive, and positive arranged in this order from the magnification side is configured to satisfy the conditional expressions (1) to (4). This makes the projection lens applicable to a projection display apparatus which is excellent in portability and allows downsizing of the housing thereof, in particular, in a thickness direction while securing good performance required of a projection lens.

According to the second projection lens of the present invention, a four group projection lens having four lens groups of negative, positive, positive, and positive arranged in this order from the magnification side is configured with less than or equal to sixe lenses and to satisfy the conditional expression (2-1). This makes the projection lens applicable to a projection display apparatus which is excellent in portability and allows downsizing of the housing thereof, while securing good performance required of a projection lens.

According to the projection display apparatus of the present invention, the projection display apparatus uses the projection lens of the present invention. This makes the projection display apparatus of the present invention excellent in portability with downsized housing, in particular, in a thickness direction, as well as having high projection performance.

BRIEF DESCRIPTION OF THE SEVERAL VIEWS OF THE DRAWINGS

FIG. 6 is a cross-sectional view of a projection lens of Example 1 of the present invention, illustrating a configuration thereof.

FIG. 7 is a cross-sectional view of a projection lens of Example 2 of the present invention, illustrating a configuration thereof.

FIG. 8 is a cross-sectional view of a projection lens of Example 3 of the present invention, illustrating a configuration thereof.

FIG. 9 is a cross-sectional view of a projection lens of Example 4 of the present invention, illustrating a configuration thereof.

FIG. 10 is a cross-sectional view of a projection lens of Example 5 of the present invention, illustrating a configuration thereof.

FIG. 11 is a cross-sectional view of a projection lens of Example 6 of the present invention, illustrating a configuration thereof.

FIG. 12 shows aberration diagrams of projection lens of Example 1.

FIG. 13 shows aberration diagrams of projection lens of Example 2.

FIG. 14 shows aberration diagrams of projection lens of Example 3.

FIG. 15 shows aberration diagrams of projection lens of Example 4.

FIG. 16 shows aberration diagrams of projection lens of Example 5.

FIG. 17 shows aberration diagrams of projection lens of Example 6.

DETAILED DESCRIPTION OF THE INVENTION

Hereinafter, embodiments of the present invention will be described in detail with reference to the accompanying drawings.

Figure 1:
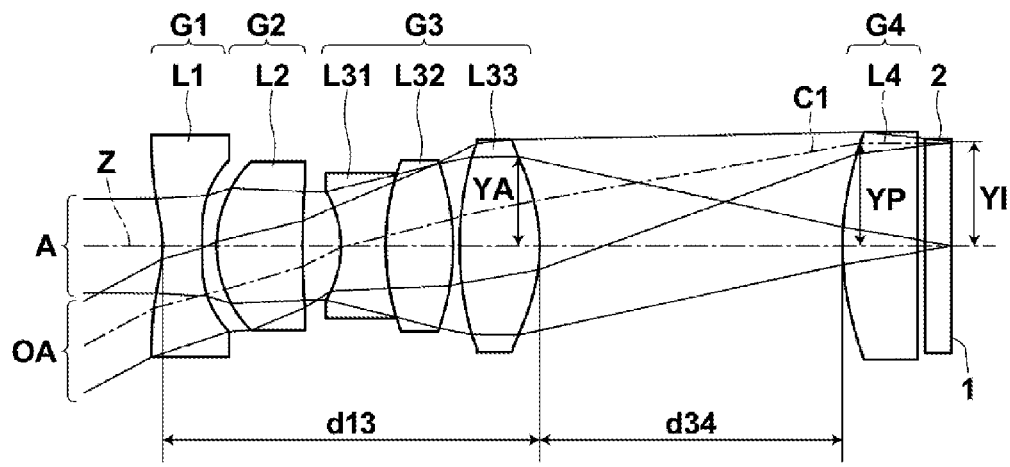
FIG. 1 is a diagram of a projection lens, illustrating a configuration and optical paths thereof.

FIG. 1 is a diagram of a projection lens according to an embodiment of the present invention, illustrating a cross-sectional view thereof with an axial luminous flux A and an off-axis luminous flux at a maximum angle of view. The configuration illustrated in FIG. 1 corresponds to that of the projection lens of Example 1 to be described later.

The projection lens according to the present embodiment includes a first lens group G1 having a negative power, a second lens group G2 having a positive power, a third lens group G3 having a positive power, and a fourth lens group G4 having a positive power arranged in this order along the optical axis Z from the magnification side to the reduction side.

For example, the first lens group G1 is composed of one lens, the lens L1, the second lens group G2 is composed of one lens, the lens L2, the third lens group G3 is composed of three lenses, the lenses L31, L32, and L33, and the fourth lens group G4 is composed of one lens, the lens L4 in the configuration example illustrated in FIG. 1.

The projection lens described above is a projection lens installed in a projection display apparatus and projects image information displayed on a reduction side conjugated position to a magnification side conjugate position. In FIG. 1, the left side is the magnification side and the right side is the reduction side, and FIG. 1 also illustrates a plane parallel member 2, such as a filter or a cover glass, and an image display surface 1 of the light valve located on a surface of the plane parallel member 2 on the reduction side on the assumption that the projection lens is installed in a projection display apparatus.

In the projection display apparatus, luminous flux to which image information is given from the image display surface 1 is inputted to the projection lens through the plane parallel member 2 and the image information is projected in an enlarged manner to a screen (not shown) disposed on the left side of the drawing by the projection lens. In this usage, the reduction side conjugate position is on the image display surface 1 and the magnification side conjugate position is on the screen.

FIG. 1 illustrates an example case in which the surface on the plane parallel member 2 on the reduction side corresponds to the image display surface 1 but their relationship is not necessarily limited to this. Further, FIG. 1 illustrates only one image display surface 1 but the projection display apparatus may be configured so as to be able to display a full color image by separating the luminous flux from the light source by a color separation optical system and disposing three light valves for the respective colors. As for the light valve, for example, a reflective liquid crystal display device, transmissive liquid crystal display device, DMD, and the like may be used.

As will be described later with reference to FIGS. 3 to 5, a luminous flux separation optical system using, for example, a prism for separating illumination light from projection light and a luminous flux combining optical system for combining luminous fluxes from a plurality of light valves are often inserted into the optical path in a projection display apparatus. As such, the projection lens of the present embodiment is configured such that the fourth lens group G4 is disposed adjacent to the reduction side conjugate position to widen the distance between the third lens group G3 and the fourth lens group G4, thereby allowing a luminous flux separation optical system and a luminous flux combining optical system to be inserted between them.

As a liquid crystal device is used as the light valve and a PBS (Polarized Beam Splitter) or a color combining prism is used as the luminous flux separation optical system or a light combining optical system, it is preferable that the projection lens of the present invention is telecentric on the reduction side.

A first embodiment of the projection lens of the present embodiment includes only four lens groups of the first lens group G1 to fourth lens group G4 described above as the lens group and satisfies conditional expressions (1) to (4) given below:

$$Bf/f \leq 1.0 \quad (1);$$

$$0.5 \leq d34/f \leq 3.0 \quad (2);$$

$$0.5 \leq YI/f \quad (3); \text{ and}$$

$$f \times d34/(YI \times YA) \leq 12.5 \quad (4),$$

where:

Bf is a back focus on the reduction side (air equivalent length);

f is a focal length of the entire system;

d34 is an air equivalent distance on the optical axis between the third lens group G3 and fourth lens group G4;

YI is a maximum height of effective luminous flux at the reduction side conjugate position; and YA is a maximum height of axial luminous flux in the projection lens.

Note that YA is a highest height among the heights of axial luminous flux from the optical axis on all of the lens surfaces of the projection lens. For example, in the example shown in FIG. 1, the height of the axial marginal light ray on the lens surface of the lens L33 on the reduction side is YA.

Preferably, the projection lens of the first embodiment described above satisfies any one or any combination of two or more of conditional expressions (5) to (9) given below:

$$f \times YP/(YI \times YA) \leq 3.0 \quad (5);$$

$$d13/YI \leq 7.5 \quad (6);$$

$$0.5 \leq |f1|/f \leq 2.5 \quad (7);$$

$$0.5 \leq f2/f \leq 5.0 \quad (8); \text{ and}$$

$$1.5 \leq f4/f \leq 5.0 \quad (9),$$

where:
YP is a maximum height of an off-axis principal ray in the projection lens;
d13 is a distance on the optical axis from the surface of the first lens group G1 on the most magnification side to the surface of the third lens group G3 on the most reduction side;
f1 is a focal length of the first lens group G1;
f2 is a focal length of the second lens group G2; and
f4 is a focal length of the fourth lens group G4.

Note that YP is a highest height among the heights of off-axis luminous flux from the optical axis at all of the lens surfaces of the projection lens. For example, in the example shown in FIG. 1, a maximum height of the principal ray Cl of the off-axis luminous flux OA in the projection lens at a maximum angle of view is YP.

A second embodiment of the projection lens of the present embodiment includes only four lens groups of the first lens group G1 to fourth lens group G4 described above as the lens groups in which the entire system is composed of less than or equal to six lenses and satisfies a conditional expression (2-1) given below:

$$0.7d34/f \leq 2.0 \quad (2-1),$$

where:
f is a focal length of the entire system; and
d34 is an air equivalent distance on the optical axis between the third lens group G3 and the fourth lens group G4 on the optical axis.

Preferably, the projection lens of the second embodiment described above satisfies any one or any combination of two or more of conditional expressions (1), and (3) to (9) given below:

$$Bf/f \leq 1.0 \quad (1);$$

$$0.5 \leq YI/f \quad (3);$$

$$f \times d34/(YI \times YA) \leq 12.5 \quad (4);$$

$$f \times YP/(YI \times YA) \leq 3.0 \quad (5);$$

$$d13/YI \leq 7.5 \quad (6);$$

$$0.5 \leq |f1|/f \leq 2.5 \quad (7);$$

$$0.5 \leq f2/f \leq 5.0 \quad (8); \text{ and}$$

$$1.5 \leq f4/f \leq 5.0 \quad (9),$$

where:
Bf is a back focus on the reduction side (air equivalent length);
f is a focal length of the entire system;
YI is a maximum height of effective luminous flux at the reduction side conjugate position;
d34 is an air equivalent distance on the optical axis between the third lens group G3 and fourth lens group G4;
YA is a maximum height of axial luminous flux in the projection lens;
YP is a maximum height of an off-axis principal ray in the projection lens;
d13 is a distance on the optical axis from the surface of the first lens group G1 on the most magnification side to the surface of the third lens group G3 on the most reduction side;
f1 is a focal length of the first lens group G1;
f2 is a focal length of the second lens group G2; and f4 is a focal length of the fourth lens group G4.

Technical significance of each conditional expression will now be described. If the projection lens exceeds the upper limit of the conditional expression (1), the back focus on the reduction side becomes too long and the lens diameter of the fourth lens group G4 is increased. In a projection lense of the lens type of the present embodiment, the lens on the most magnification side or the lens on the most reduction side generally has a maximum lens diameter in the entire system. If the projection lens exceeds the upper limit of the conditional expression (1), the lens diameter of the fourth lens group G4 which is the lens group on the most reduction side is increased, thereby causing difficulty in reducing the lens diameter of the overall projection lens.

If the projection lens falls below the lower limit of the conditional expression (2), it is difficult to secure a space for inserting a luminous flux separation optical system and a luminous flux combining optical system between the third lens group G3 and fourth lens group G4. If the projection lens exceeds the upper limit of the conditional expression (2), it is difficult to reduce the total length of the lens system in an optical axis direction. That is, a luminous flux separation optical system and a luminous flux combining optical system are allowed to be inserted while the total length of the entire system in an optical axis direction is prevented from becoming too long by satisfying the conditional expression (2).

If the projection lens falls below the lower limit of the conditional expression (3), it is difficult to broaden the angle of view so that the projection lens can not be said to be suitable for use with the intended projection display apparatus of the present invention.

If the projection lens exceeds the upper limit of the conditional expression (4), it is difficult to realize a projection lens with a small F-value required as an application to the intended projection display apparatus of the present invention.

The conditional expression (5) is a formula for downsizing the optical system while securing a small F-value. If the projection lens exceeds the upper limit of the conditional expression (5), the lens diameter of the lens on the most magnification side or the lens on the most reduction side is increased, thereby causing difficulty in reducing the lens diameter of the overall projection lens.

If the projection lens exceeds the upper limit of the conditional expression (6), the length from the first lens group G1 to the third lens group G3 in an optical axis direction becomes long, thereby causing difficulty in reducing the total length of the overall lens system in the optical axis direction.

If the projection lens falls below the lower limit of the conditional expression (7), it is difficult to prevent various types of aberrations, in particular, field curvature and distortion. If the projection lens exceeds the upper limit of the conditional expression (7), it is difficult to broaden the angle of view so that the projection lens can not be said to be suitable for use with the target projection display apparatus of the present invention.

If the projection lens falls below the lower limit of the conditional expression (8), the power of the second lens group G2 becomes strong and it is difficult to prevent various types of aberrations, in particular, spherical aberration. If the projection lens exceeds the upper limit of the conditional expression (8), the power of the second lens group G2 becomes weak and the power of the third lens group G3 becomes strong in order to keep the balance, whereby it is difficult to prevent various types of aberrations, in particular, spherical aberration.

If the projection lens falls below the lower limit of the conditional expression (9), it is difficult to maintain the telecentricity of the projection lens on the reduction side. If the projection lens exceeds the upper limit of the conditional expression (9), it is difficult to reduce the lens diameter of the overall projection lens.

Further, the projection lens may exhibit the functional effects that can be obtained when the conditional expression (1) is satisfied more significantly if the projection lens is configured to satisfy a conditional expression (1-1) given below, instead of the conditional expression (1):

$$Bf/f \leq 10.5 \tag{1-1}$$

Further, the projection lens may exhibit the functional effects that can be obtained when the conditional expression (2) is satisfied more significantly if the projection lens is configured to satisfy a conditional expression (2-1) given below, instead of the conditional expression (2):

$$0.7 \leq d34/f \leq 2.0 \tag{2-1}$$

Still further, the projection lens may exhibit the functional effects that can be obtained when the lower limit of the conditional expression (2-1) is satisfied more significantly while obtaining functional effects that can be obtained when the upper limit of the conditional expression (2-1) is satisfied if the projection lens is configured to satisfy a conditional expression (2-2) given below, instead of the conditional expression (2-1):

$$1.0 \leq d34/f \leq 2.0 \tag{2-2}$$

Further, the projection lens may exhibit the functional effects that can be obtained when the conditional expression (4) is satisfied more significantly if the projection lens is configured to satisfy a conditional expression (4-1) given below, instead of the conditional expression (4):

$$f \times d34/(YI \times YA) \leq 10.0 \tag{4-1}$$

Further, the projection lens may exhibit the functional effects that can be obtained when the conditional expression (5) is satisfied more significantly if the projection lens is configured to satisfy a conditional expression (5-1) given below, instead of the conditional expression (5):

$$f \times YP/(YI \times YA) \leq 2.6 \tag{5-1}$$

Further, the projection lens may exhibit the functional effects that can be obtained when the conditional expression (6) is satisfied more significantly if the projection lens is configured to satisfy a conditional expression (6-1) given below, instead of the conditional expression (6):

$$d13/YI \leq 5.0 \tag{6-1}$$

Further, the projection lens may exhibit the functional effects that can be obtained when the conditional expression (7) is satisfied more significantly if the projection lens is configured to satisfy a conditional expression (7-1) given below, instead of the conditional expression (7):

$$0.5 \leq |f1|/f \leq 1.5 \tag{7-1}$$

Further, the projection lens may exhibit the functional effects that can be obtained when the upper limit of the conditional expression (8) is satisfied more significantly while satisfying the functional effects that can be obtained when the lower limit of the conditional expression is satisfied if the projection lens is configured to satisfy a conditional expression (8-1) given below, instead of the conditional expression (8):

$$0.5 \leq f2/f \leq 2.0 \tag{8-1}$$

Further, the projection lens may exhibit the functional effects that can be obtained when the conditional expression (9) is satisfied more significantly if the projection lens is configured to satisfy a conditional expression (9-1) given below, instead of the conditional expression (9):

$$2.0 \leq f4/f \leq 3.5 \tag{9-1}$$

Preferably, the projection lens according to the present embodiment selectively has compositions described below as appropriate. As a preferable embodiment, the projection lens may have any one or a combination of any of a plurality of compositions described below.

The first lens group G1 may be composed of only one negative lens, which may contribute to the downsizing of the optical system by keeping down the number of lenses. Preferably, the first lens group G1 has at least one aspherical surface. This allows the resolving power of the projection lens to be improved while reducing the number of lenses used.

The second lens group G2 may be composed of only one positive lens, which may contribute to the downsizing of the optical system by keeping down the number of lenses. Preferably, the second lens group G2 has at least one aspherical surface. This allows the resolving power of the projection lens to be improved while reducing the number of lenses used.

Preferably, the number of lenses in the third lens group G3 is not greater than three, which may contribute to the downsizing of the optical system by keeping down the number of lenses. Preferably, the third lens group G3 has at least one aspherical surface. This allows the resolving power of the projection lens to be improved while reducing the number of lenses used.

For example, the third lens group G3 may be composed only of one positive meniscus lens with a convex surface on the reduction side, which allows a light weight and inexpensive projection lens to be composed. Further, the third lens group G3 may be composed of a biconcave lens and a biconvex lens arranged in this order from the magnification side, which allows chromatic aberration, in particular, axial chromatic aberration to be corrected more satisfactorily in comparison with the case in which the third lens group G3 is composed of one lens. Alternatively, the third lens group G3 may be composed of three lenses, one negative lens and two positive lenses, which facilitates to ensure high telecentricity while allowing various types of aberrations, including chromatic aberration, to be corrected satisfactorily.

The fourth lens group G4 may be composed of only one positive lens, which may contribute to the downsizing of the optical system by keeping down the number of lenses. Preferably, the fourth lens group G4 has at least one aspherical surface. This allows the resolving power of the projection lens to be improved while reducing the number of lenses used.

For example, the fourth lens group G4 may be composed of a plano-convex lens with the plane surface on the reduction side disposed adjacent to the reduction side conjugate position.

Preferably, the projection lens according to an embodiment of the present invention is composed such that the total number of lenses used in the entire system is not greater than six. This may contribute to the downsizing of the optical system by keeping down the number of lenses.

Preferably, in the projection lens according to an embodiment of the present invention, the lens disposed on the most magnification side or the lens disposed on the most reduction side has a non-circular shape which includes an effective luminous flux passing area. Further, a lens other than that disposed on the most magnification side or on the most reduction side may also have a non-circular shape which includes an effective luminous flux passing area. In this way, by cutting a predetermined area other than an effective luminous flux passing area and forming a lens in a non-circular shape which includes the effective luminous flux passing area, the lens diameter may be reduced and thereby contributing to the downsizing.

Figure 2:
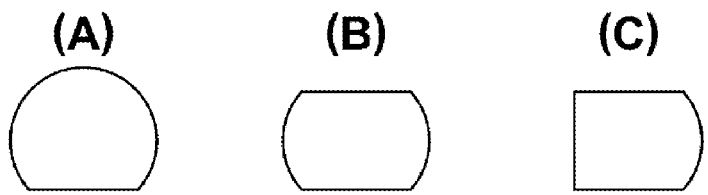
FIGS. 2A to 2C illustrate specific examples of non-circular lens shapes viewed from the traveling direction of luminous flux.

As for the non-circular shape, various lens shapes different from a circular shape viewed from the traveling direction of the luminous flux are possible. For example, as illustrated in FIGS. 2A to 2C, the lens shape viewed from the optical axis direction may be a shape formed by cutting out one arcuate area from a circle as illustrated in FIG. 2A, a shape formed by cutting out two facing arcuate areas from a circle as illustrated in FIG. 2B, or a shape formed by further cutting out one arculate area from the shape of FIG. 2B as illustrated in FIG. 2C.

Embodiments of the projection display apparatus of the present invention will now be described. FIGS. 3 to 5 are schematic diagrams of the projection display apparatuses according to embodiments of the present invention which use the projection lens of the present embodiment, illustrating major portions thereof.

Figure 3:
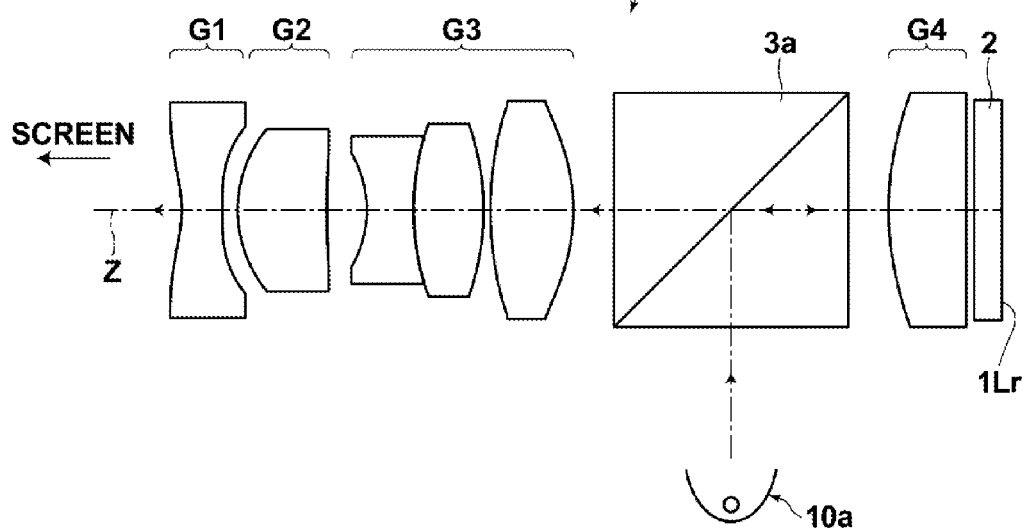
FIG. 3 is a schematic diagram of a projection display apparatus according to an embodiment of the present invention, illustrating a major portion thereof.

A projection display apparatus 100A shown in FIG. 3 uses a reflective liquid crystal display panel 1Lr as the light valve. The projection display apparatus 100A includes the reflective liquid crystal display panel 1Lr, a PBS prism 3a disposed between the third lens group G3 and the fourth lens group G4, and a light source 10a for emitting illumination light to the PBS prism 3a from a direction perpendicular to the optical axis Z. The luminous flux from the light source 10a is polarization-split by the PBS prism 3a and only polarized light in a predetermined direction is incident on the reflective liquid crystal display panel 1Lr through the fourth lens group G4 and the plane parallel plate 2, such as a filter or the like. Then, the luminous flux optically modulated by the reflective liquid crystal display panel 1Lr propagates along the optical axis Z, transmits through the PBS prism 3a and the projection lens, and is projected to a screen.

Figure 4:
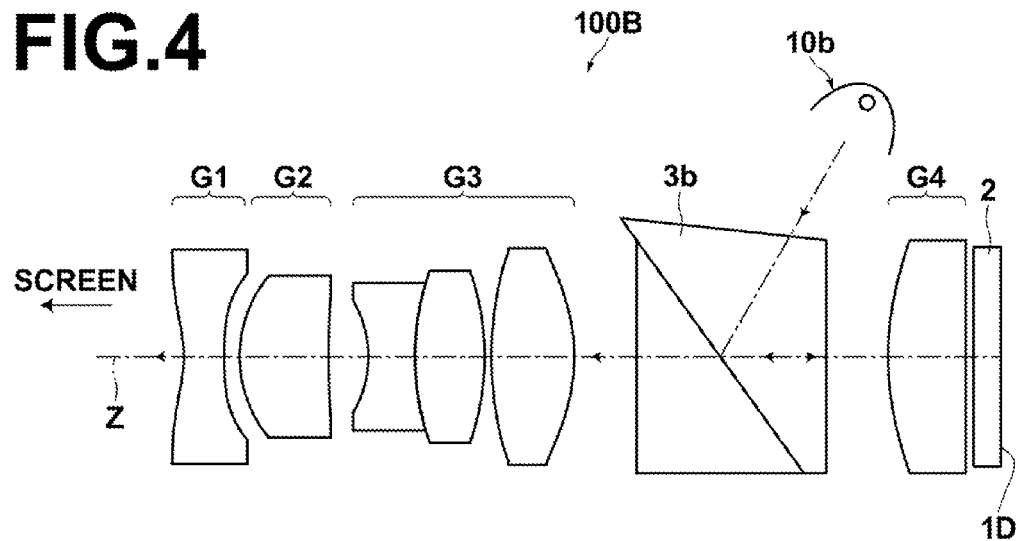
FIG. 4 is a schematic diagram of a projection display apparatus according to an embodiment of the present invention, illustrating a major portion thereof.

A projection display apparatus 100B shown in FIG. 4 uses a DMD 1D as the light valve. The projection display apparatus 100B includes the DMD 1D, a TIR (Total Internal Reflection) prism 3b disposed between the third lens group G3 and the fourth lens group G4, and a light source 10b for emitting illumination light to the TIR prism 3b. The luminous flux from the light source 10b is internally reflected by the TIR prism 3b and incident on the DMD 1D through the fourth lens group G4 and the plane parallel plate 2, such as a filter or the like. Then, the luminous flux optically modulated by the DMD 1D propagates along the optical axis Z, transmits through the TIR prism 3b and the projection lens, and is projected to a screen.

Figure 5:
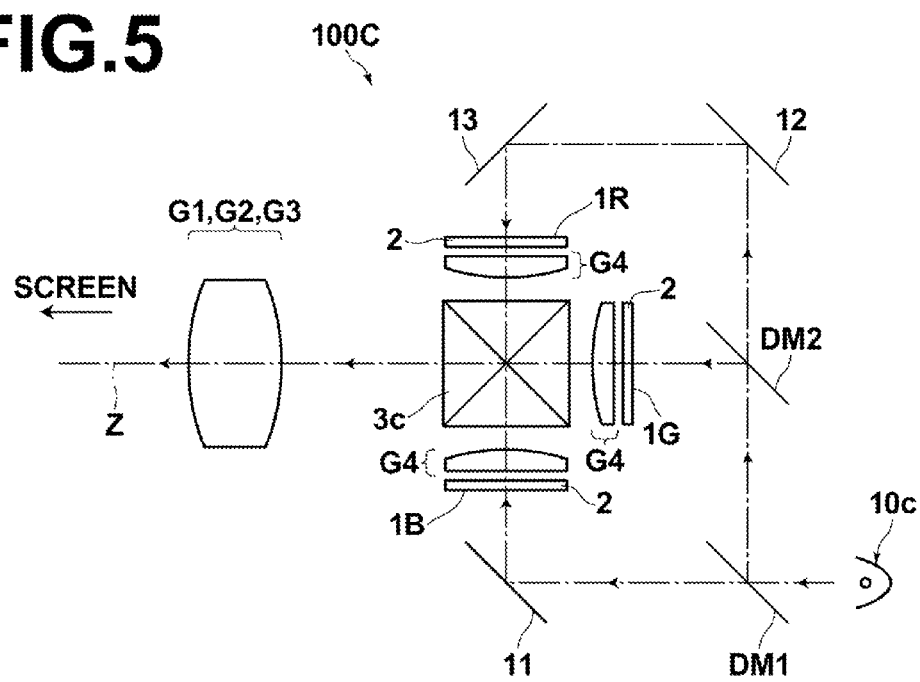
FIG. 5 is a schematic diagram of a projection display apparatus according to an embodiment of the present invention, illustrating a major portion thereof.

A projection display apparatus 100C shown in FIG. 5 is an apparatus that separates luminous flux into blue, green, and blue colors and optically modulates each color, which uses three transmissive liquid crystal display panels 1R, 1G, and 1B as the light valves with the fourth lens group G4 being disposed in the optical path of each color. The projection display apparatus 100C includes the transmissive liquid crystal display panels 1R, 1G, and 1B, a light source 10c for emitting white light, dichroic mirrors DM1, DM2 for separating the luminous flux from the light source 10c into red, green, and blue colors, total reflection mirrors 11, 12, 13 for guiding the luminous fluxes to predetermined directions, and cross dichroic prism 3c for combining the luminous fluxes.

The luminous flux from the light source 10c is separated into each color by the dichroic mirrors DM1, DM2. Then, each color is modulated by transmitting through the transmissive liquid crystal display panel 1R, 1G, or 1B and incident on the cross dichroic prism 3c through the plane parallel plates 2, such as a filter, and fourth lens group G4 and combined into one luminous flux by the cross dichroic prism 3c. The combined luminous flux propagates along the optical axis Z, transmits through the first lens group G1 to third lens group G3 of the projection lens and is projected to a screen. Note that the first lens group G1 to third lens group G3 are schematically illustrated as a block in FIG. 5.

Next, numerical examples of the projection lens of the present invention will be described. FIGS. 6 to 11 are cross-sectional views of projection lenses of Example 1 to Example 6 of the present invention.

The projection lens of Example 1 shown in FIG. 6 includes four lens groups of a first lens group G1 having a negative power, a second lens group G2 having a positive power, a third lens group G3 having a positive power, and a fourth lens group G4 having a positive power arranged in this order from the magnification side, in which the entire system is composed of six lenses and the reduction side is telecentric. The first lens group G1 is composed of a negative lens L1 having a biconcave shape in the paraxial region, the second lens group G2 is composed of a positive meniscus lens L2 with a convex surface on the magnification side in the paraxial region, the third lens group G3 is composed of a biconcave negative lens L31, a biconvex positive lens L32, and a positive lens L33 having a biconvex shape in the paraxial region arranged in this order from the magnification side, and the fourth lens group G4 is composed of a plano-convex positive lens L4 with a plane surface on the reduction side in the paraxial region. The lens L31 and lens L32 are cemented. Both surfaces of the lenses L1, L2, L33 and a surface of the lens L4 on the magnification side are aspherical.

The projection lens of Example 2 shown in FIG. 7 includes four lens groups of a first lens group G1 having a negative power, a second lens group G2 having a positive power, a third lens group G3 having a positive power, and a fourth lens group G4 having a positive power arranged in this order from the magnification side, in which the entire system is composed of four lenses which are uncemented single lenses and the reduction side is telecentric. The first lens group G1 is composed of a negative lens L1 having a biconcave shape in the paraxial region, the second lens group G2 is composed of a positive lens L2 having a biconvex shape in the paraxial region, the third lens group G3 is composed of a positive meniscus lens L3 with a convex shape on the reduction side in the paraxial region, and the fourth lens group G4 is composed of a plano-convex positive lens L4 with a plane surface on the reduction side in the paraxial region. Both surfaces of lenses L1, l2, L3, and a surface of the lens L4 on the magnification side are aspherical. Note that FIG. 7 illustrates an example case in which a prism 3 which is assumed to be a luminous flux separation optical system or a luminous flux combining optical system is inserted between the third lens group G3 and fourth lens group G4.

The projection lens of Example 3 shown in FIG. 8 includes four lens groups of a first lens group G1 having a negative power, a second lens group G2 having a positive power, a third lens group G3 having a positive power, and a fourth lens group G4 having a positive power arranged in this order from the magnification side, in which the entire system is composed of five lenses which are uncemented single lenses and the reduction side is telecentric. The first lens group G1 is composed of a negative meniscus lens L1 with a convex surface on the magnification side in the paraxial region, the second lens group G2 is composed of a positive lens L2 having a biconvex shape in the paraxial region, the third lens group G3 is composed of a negative lens L31 having a biconcave shape in the paraxial region and a positive lens L32 having a biconvex shape in the paraxial region arranged in this order from the magnification side, and the fourth lens group G4 is composed of a plano-convex positive lens L4 with a plane surface on the reduction side in the paraxial region. Both surfaces of Lenses L1, L2, L3, and a surface of the lens L4 on the magnification side are aspherical. Note that FIG. 8 illustrates an example case in which a prism 3 which is assumed to be a luminous flux separation optical system or a luminous flux combining optical system is inserted between the third lens group G3 and fourth lens group G4.

The projection lens of Example 4 shown in FIG. 9 includes four lens groups of a first lens group G1 having a negative power, a second lens group G2 having a positive power, a third lens group G3 having a positive power, and a fourth lens group G4 having a positive power arranged in this order from the magnification side, in which the entire system is composed of four lenses which are uncemented single lenses and the reduction side is telecentric. The first lens group G1 is composed of a negative lens L1 having a biconcave shape in the paraxial region, the second lens group G2 is composed of a positive lens L2 having a biconvex shape in the paraxial region, the third lens group G3 is composed of a positive meniscus lens L3 with a convex surface on the reduction side in the paraxial region, and the fourth lens group G4 is composed of a plano-convex positive lens L4 with a plane surface on the reduction side in the paraxial region. Both surfaces of Lenses L1, L2, L3, and a surface of the lens L4 on the magnification side are aspherical.

The projection lens of Example 5 shown in FIG. 10 includes four lens groups of a first lens group G1 having a negative power, a second lens group G2 having a positive power, a third lens group G3 having a positive power, and a fourth lens group G4 having a positive power arranged in this order from the magnification side, in which the entire system is composed of five lenses which are uncemented single lenses and the reduction side is telecentric. The first lens group G1 is composed of a negative meniscus lens L1 with a convex surface on the reduction side in the paraxial region, the second lens group G2 is composed of a positive lens L2 having a biconvex shape in the paraxial region, the third lens group G3 is composed of a negative lens L31 having a biconcave shape in the paraxial region and a positive lens L32 having a biconvex shape in the paraxial region arranged in this order from the magnification side, and the fourth lens group G4 is composed of a plano-convex positive lens L4 with a plane surface on the reduction side in the paraxial region. Both surfaces of Lenses L1, L2, L31, L32, and a surface of the lens L4 on the magnification side are aspherical.

The projection lens of Example 6 shown in FIG. 11 includes four lens groups of a first lens group G1 having a negative power, a second lens group G2 having a positive power, a third lens group G3 having a positive power, and a fourth lens group G4 having a positive power arranged in this order from the magnification side, in which the entire system is composed of six lenses which are uncemented single lenses and the reduction side is telecentric. The first lens group G1 is composed of a negative lens L1 having a biconcave shape in the paraxial region, the second lens group G2 is composed of a positive meniscus lens L2 with a convex surface on the magnification side in the paraxial region, the third lens group G3 is composed of a positive meniscus lens L31 with a convex surface on the reduction side in the paraxial region, a biconcave negative lens L32, and a positive lens L33 having a biconvex shape in the paraxial region arranged in this order from the magnification side, and the fourth lens group G4 is composed of a plano-convex positive lens L4 with a plane surface on the reduction side in the paraxial region. Both surfaces of Lenses L1, L2, L33, and a surface of the lens L4 on the magnification side are aspherical.

Basic lens data of the projection lens of Example 1 are shown in Table 1. The focal length of the entire system f, F-value (F-number) Fno, and maximum height YI of effective luminous flux at the reduction side conjugate position are shown on the top of Table 1. OBJ and IMG in Table 1 represent the magnification side conjugate surface and reduction side conjugate surface respectively. The Si column indicates the number of $i^{th}$ (i=1, 2, 3, - - - ) surface which is sequentially increased toward the reduction side with a magnification side surface of a component on the most magnification side being taken as the first surface. The Ri column indicates a radius of curvature of $i^{th}$ surface and the Di column indicates a surface distance on the optical axis Z between the $i^{th}$ surface and $(i+1)^{th}$ surface. The Ndj column indicates a refractive index of $j^{th}$ (j=1, 2, 3, - - - ) lens, which is sequentially increased toward the reduction side with a lens on the most magnification side being taken as the first lens, with respect to d-line (wavelength of 587.6 nm), and the vdj column indicates an Abbe number of $j^{th}$ lens with respect to d-line. The basic lens data include the plane parallel member 2.

Note that the radius of curvatures and surface distances in Table 1 are normalized values with the focal length of the projection lens being taken as 1.00. The sign of the radius of curvature is positive if the surface shape is convex on the magnification side and negative if the surface shape is convex on the reduction side. In Table 1, the surface number with * mark attached thereto indicates that the surface of that number is aspherical and a value of radius of paraxial curvature is indicated in the column of the radius of curvature of the aspherical surface.

Aspherical surface coefficients of the aspherical surfaces of the projection lens of Example 1 are shown in Table 2. The "E−n (n:integer)" in an aspherical surface coefficient value in Table 2 refers to "×10$^{-n}$" and "E+n" refers to "×10$^{n}$". The aspherical surface coefficient is each of coefficients K, $A_m$ (m=3, 4, 5, - - - ) in an aspherical surface expression represented by the formula given below:

$$Zd = \frac{C \times Y^2}{1 + \sqrt{1 - K \times C^2 \times Y^2}} + \sum_m A_m Y^m$$

where,

Zd is a length of a perpendicular line drawn from a point on the aspherical surface at a distance Y from the optical axis to a tangent plane to the apex of the aspherical surface (plane orthogonal to the optical axis);

Y is a distance from the optical axis;

C is a curvature near the optical axis; and $K, A_m$ are aspherical surface coefficients (m=3, 4, 5, - - - ).

Likewise, basic lens data and aspherical surface coefficients of projection lenses of Examples 2 to 6 are shown in Table 3 to Table 12. The meaning of each symbol in the tables and notation method are identical to those of Example 1 described above. Note that, however, the basic lens data of Examples 2 and 3 include the prism 3 illustrated in FIGS. 7 and 8. In each table given below, values rounded at a predetermined digit are provided.

TABLE 1

EXAMPLE 1
BASIC LENS DATA
f = 1.00 Fno = 2.0 YI = 0.538

| Si | Ri | Di | Ndj | vdj |
|---|---|---|---|---|
| OBJ | ∞ | 116.5824 | | |
| 1* | −0.5658 | 0.2043 | 1.53389 | 56.0 |
| 2* | 141.2691 | 0.0760 | | |
| 3* | 0.6591 | 0.4462 | 1.63351 | 23.6 |
| 4* | 3.8348 | 0.2004 | | |
| 5 | −0.5581 | 0.2327 | 1.80518 | 25.4 |
| 6 | 1.3129 | 0.3520 | 1.77250 | 49.6 |
| 7 | −1.3129 | 0.0338 | | |
| 8* | 1.6504 | 0.4158 | 1.53389 | 56.0 |
| 9* | −0.9442 | 1.5760 | | |
| 10* | 1.4487 | 0.3906 | 1.53389 | 56.0 |
| 11 | ∞ | 0.0391 | | |
| 12 | ∞ | 0.1367 | 1.52000 | 63.4 |
| 13 | ∞ | 0.0000 | | |
| IMG | ∞ | | | |

TABLE 2

EXAMPLE 1
ASPHERICAL SURFACE COEFFICIENT

| SURFACE | K | $A_3$ | $A_4$ | $A_5$ | $A_6$ |
|---|---|---|---|---|---|
| 1 | −8.2585E+00 | −8.4103E−02 | 4.4508E+00 | −9.0230E+00 | −2.2678E+00 |
| 2 | −2.9719E+06 | 1.9432E−02 | 1.1776E+00 | −2.6878E+01 | 6.4573E+00 |
| 3 | 8.5722E−01 | 4.9644E−02 | 2.4117E+00 | −1.3709E+01 | 2.2952E+01 |
| 4 | 6.1392E+01 | −2.5992E−02 | −1.5504E+00 | 2.0516E+01 | −1.3218E+02 |
| 8 | 7.7096E−02 | −4.4217E−02 | −1.9789E−01 | 2.5528E+00 | −1.2476E+01 |
| 9 | 1.6531E+00 | −4.5023E−02 | 3.1598E−01 | 1.3435E+00 | −6.2372E+00 |
| 10 | 3.2430E−01 | 0.0000E+00 | −9.8182E−02 | 0.0000E+00 | 0.0000E+00 |

| SURFACE | $A_7$ | $A_8$ | $A_9$ | $A_{10}$ | $A_{11}$ |
|---|---|---|---|---|---|
| 1 | 1.9176E+01 | 1.4409E+01 | −8.3711E+01 | 7.5968E+01 | −1.6197E+01 |
| 2 | 6.3919E+00 | 1.2918E+02 | −2.0234E+02 | 3.2403E+02 | −1.2725E+03 |
| 3 | −1.3297E+02 | −2.3340E+01 | 3.7625E+01 | −1.4707E+02 | 5.7815E+02 |
| 4 | 2.7205E+02 | 9.0129E+02 | −6.1043E+03 | 1.5729E+04 | −2.4250E+04 |
| 8 | 2.2419E+01 | 1.1140E+01 | −7.5230E+01 | 2.9712E+01 | 1.1328E+02 |
| 9 | 1.1296E+01 | 3.7351E+00 | −2.6006E+01 | −1.7964E+01 | 1.1789E+02 |
| 10 | 0.0000E+00 | 0.0000E+00 | 0.0000E+00 | 0.0000E+00 | 0.0000E+00 |

| SURFACE | $A_{12}$ | $A_{13}$ | $A_{14}$ | $A_{15}$ | $A_{16}$ |
|---|---|---|---|---|---|
| 1 | 7.8426E+00 | −6.0387E+00 | 3.1729E+00 | −8.3790E+00 | 2.6881E+01 |
| 2 | 1.1206E+03 | 4.7628E+02 | 5.0582E+02 | −5.1252E+02 | 1.6064E+03 |
| 3 | −8.6424E+02 | 1.3059E+01 | 1.6162E+03 | 1.9553E+03 | −2.2849E+04 |
| 4 | 1.0726E+04 | 2.3339E+04 | 1.7973E+04 | −1.2236E+05 | 4.1386E+05 |
| 8 | −9.4279E+01 | −3.1389E+00 | −1.0521E+01 | −2.4805E+01 | −1.9824E+01 |
| 9 | −9.2284E+01 | −9.5165E+00 | 1.6864E+01 | −1.8239E+00 | 4.7057E+00 |
| 10 | 0.0000E+00 | 0.0000E+00 | 0.0000E+00 | 0.0000E+00 | 0.0000E+00 |

| SURFACE | $A_{17}$ | $A_{18}$ | $A_{19}$ | $A_{20}$ |
|---|---|---|---|---|
| 1 | −7.2890E+01 | −2.8283E+00 | −8.8073E+01 | 2.3903E+02 |
| 2 | −2.1433E+03 | −1.5164E+02 | −1.5495E+04 | 1.1725E+04 |
| 3 | 2.0585E+04 | 3.4765E+04 | 7.3863E+04 | −1.8784E+05 |
| 4 | −1.7781E+05 | −4.5790E+05 | −4.0496E+06 | 6.2426E+06 |
| 8 | 1.8250E+02 | 2.7805E+02 | 1.2789E+02 | −1.3434E+03 |
| 9 | 5.0412E+01 | 4.7616E+01 | −1.5401E+02 | 1.2313E+02 |
| 10 | 0.0000E+00 | 0.0000E+00 | 0.0000E+00 | 0.0000E+00 |

TABLE 3

EXAMPLE 2
BASIC LENS DATA
f = 1.00 Fno = 2.0 YI = 0.560

| Si | Ri | Di | Ndj | vdj |
|---|---|---|---|---|
| OBJ | ∞ | 103.2825 | | |
| 1* | −0.5002 | 0.1017 | 1.48999 | 65.4 |
| 2* | 0.6501 | 0.1856 | | |
| 3* | 0.6450 | 0.4622 | 1.58499 | 42.7 |
| 4* | −1.1337 | 0.7268 | | |
| 5* | −1.2103 | 0.4066 | 1.58501 | 61.7 |
| 6* | −0.6938 | 0.2033 | | |
| 7 | ∞ | 1.2199 | 1.51633 | 64.1 |
| 8 | ∞ | 0.2033 | | |
| 9* | 1.4352 | 0.4066 | 1.53114 | 55.4 |
| 10 | ∞ | 0.0407 | | |
| 11 | ∞ | 0.1423 | 1.52308 | 58.6 |
| 12 | ∞ | 0.0000 | | |
| IMG | ∞ | | | |

TABLE 5

EXAMPLE 3
BASIC LENS DATA
f = 1.00 Fno = 2.0 YI = 0.609

| Si | Ri | Di | Ndj | vdj |
|---|---|---|---|---|
| OBJ | ∞ | 112.2327 | | |
| 1* | 12.4960 | 0.2721 | 1.53389 | 56.0 |
| 2* | 0.5448 | 0.1711 | | |
| 3* | 1.0058 | 0.5523 | 1.63351 | 23.6 |
| 4* | −1.1456 | 0.1526 | | |
| 5* | −0.6296 | 0.3314 | 1.63351 | 23.6 |
| 6* | 0.6907 | 0.0463 | | |
| 7* | 0.5267 | 0.5523 | 1.53389 | 56.0 |
| 8* | −0.6194 | 0.2209 | | |
| 9 | ∞ | 1.3256 | 1.51633 | 64.1 |
| 10 | ∞ | 0.2209 | | |
| 11* | 1.5596 | 0.4419 | 1.53114 | 55.4 |
| 12 | ∞ | 0.0442 | | |
| 13 | ∞ | 0.1547 | 1.52308 | 58.6 |
| 14 | ∞ | 0.0000 | | |
| IMG | ∞ | | | |

TABLE 4

EXAMPLE 2
ASPHERICAL SURFACE COEFFICIENT

| SURFACE | K | $A_3$ | $A_4$ | $A_5$ | $A_6$ |
|---|---|---|---|---|---|
| 1 | 0.0000E+00 | 2.4957E−01 | 1.6887E+00 | −1.2878E+00 | −1.8151E+00 |
| 2 | 0.0000E+00 | 2.0957E−01 | −3.0678E+00 | 4.1994E+00 | 3.2259E+00 |
| 3 | 0.0000E+00 | −5.6557E−02 | −1.4619E+00 | 5.4421E−01 | 1.1264E+00 |
| 4 | 0.0000E+00 | −7.8101E−03 | 4.2878E−01 | −1.1464E+00 | 3.3039E−01 |
| 5 | 0.0000E+00 | 4.1760E−02 | −7.4818E−01 | 1.8359E+00 | −2.0487E+00 |
| 6 | 0.0000E+00 | −3.7197E−02 | 2.3991E−01 | −2.3840E+00 | 6.3149E+00 |
| 9 | −6.1085E+00 | 0.0000E+00 | 3.2681E−01 | 0.0000E+00 | 0.0000E+00 |

| SURFACE | $A_7$ | $A_8$ | $A_9$ | $A_{10}$ | $A_{11}$ |
|---|---|---|---|---|---|
| 1 | 9.4783E−01 | 2.1117E+00 | −5.0946E−02 | −3.2849E+00 | −4.8054E−02 |
| 2 | −3.9937E+00 | −6.7287E+00 | −1.8703E+00 | 4.8003E+00 | 7.2294E+00 |
| 3 | 9.0197E−01 | 1.9702E+00 | −1.2215E+00 | −4.5505E+00 | −1.5035E+00 |
| 4 | 1.4712E+00 | 1.8975E+00 | −2.2158E+00 | −2.7734E+00 | 1.7514E+00 |
| 5 | −7.1308E+00 | 7.3426E+00 | 1.0884E+01 | 5.6818E+00 | 5.7097E+00 |
| 6 | −3.5279E+00 | −1.3806E+01 | 2.5810E+00 | 2.0700E+01 | 2.0803E+01 |
| 9 | 0.0000E+00 | 0.0000E+00 | 0.0000E+00 | 0.0000E+00 | 0.0000E+00 |

| SURFACE | $A_{12}$ | $A_{13}$ | $A_{14}$ | $A_{15}$ | $A_{16}$ |
|---|---|---|---|---|---|
| 1 | 1.2111E+00 | 5.0670E+00 | 2.9455E+00 | 1.3243E+00 | −5.3128E+00 |
| 2 | 4.0116E+00 | −1.0317E+00 | −3.9868E+00 | −4.7846E+00 | −3.2158E+00 |
| 3 | −1.3233E+00 | 2.9995E−01 | 2.9016E+00 | 3.3612E+00 | 3.1478E+00 |
| 4 | 1.2760E+00 | −2.3061E−01 | −2.4312E+00 | −4.8961E+00 | −4.4513E+00 |
| 5 | −3.1417E+00 | −1.1098E+00 | −1.6121E+01 | −1.7387E+01 | −1.4709E+01 |
| 6 | 1.2138E+01 | −3.7655E+00 | −2.1168E+01 | −3.4137E+01 | −3.8346E+01 |
| 9 | 0.0000E+00 | 0.0000E+00 | 0.0000E+00 | 0.0000E+00 | 0.0000E+00 |

| SURFACE | $A_{17}$ | $A_{18}$ | $A_{19}$ | $A_{20}$ |
|---|---|---|---|---|
| 1 | −1.4544E+01 | −1.1459E+01 | −5.4951E+00 | 3.7943E+01 |
| 2 | −6.0720E−01 | 3.4300E+00 | −2.6639E+00 | 5.2699E+00 |
| 3 | −2.1467E+00 | −1.0136E+01 | −1.2731E+01 | 2.4133E+01 |
| 4 | −1.8596E+00 | 3.9824E+00 | 9.8542E+00 | 1.0812E+01 |
| 5 | −7.5574E+00 | 3.7151E+00 | 1.7189E+01 | 4.5828E+01 |
| 6 | −3.0539E+01 | −8.4494E+00 | 2.9360E+01 | 8.7607E+01 |
| 9 | 0.0000E+00 | 0.0000E+00 | 0.0000E+00 | 0.0000E+00 |

TABLE 6

EXAMPLE 3
ASPHERICAL SURFACE COEFFICIENT

| SURFACE | K | $A_3$ | $A_4$ | $A_5$ | $A_6$ |
|---|---|---|---|---|---|
| 1 | 0.0000E+00 | −6.3938E−02 | 2.3839E−01 | −5.8788E−01 | 6.0119E−01 |
| 2 | 0.0000E+00 | 8.5279E−03 | −3.1322E−01 | −4.8217E−01 | 1.1343E+00 |
| 3 | 0.0000E+00 | 1.0235E−02 | 1.9898E−01 | 8.1627E−02 | −2.4791E+00 |
| 4 | 0.0000E+00 | 6.1623E−02 | 2.1759E+00 | 2.4852E−01 | −8.7297E+00 |
| 5 | 0.0000E+00 | −1.8151E−01 | 7.4362E+00 | −2.3854E+01 | 2.3027E+01 |
| 6 | 0.0000E+00 | −2.3105E−01 | −1.5997E+00 | −1.9590E+00 | 6.1737E+00 |
| 7 | 0.0000E+00 | −1.3755E−01 | −4.5652E+00 | 4.4826E+00 | 1.1065E+01 |
| 8 | 0.0000E+00 | 2.9392E−02 | −4.0762E−01 | 7.6293E−01 | −8.2829E−01 |
| 11 | 3.3915E+00 | 0.0000E+00 | −9.4994E−02 | 0.0000E+00 | 0.0000E+00 |

| SURFACE | $A_7$ | $A_8$ | $A_9$ | $A_{10}$ | $A_{11}$ |
|---|---|---|---|---|---|
| 1 | 5.9172E−01 | 2.5187E−02 | −1.9905E+00 | −3.0675E+00 | 1.4862E+00 |
| 2 | 3.2947E−01 | 1.4836E+00 | −4.8478E−01 | −2.6282E+00 | −5.1535E+00 |
| 3 | 6.0253E+00 | 5.2586E+00 | −2.4802E+00 | −1.0119E+01 | −1.6278E+01 |
| 4 | 4.1127E+00 | 1.8852E+01 | 5.0873E+01 | 4.0578E+01 | −2.2840E+02 |
| 5 | 1.3546E+01 | −5.2929E+01 | −1.4324E+02 | 4.0429E+02 | 5.7222E+02 |
| 6 | 1.7390E+01 | −1.4302E+01 | −6.7493E+01 | −7.2730E+01 | 3.4282E+01 |
| 7 | −6.2771E+00 | −2.2740E+01 | −2.4017E+01 | 2.4187E+01 | 8.9103E+01 |
| 8 | −8.2785E−01 | 8.2969E−01 | −1.3856E+00 | 1.5215E+01 | 1.2386E+01 |
| 11 | 0.0000E+00 | 0.0000E+00 | 0.0000E+00 | 0.0000E+00 | 0.0000E+00 |

| SURFACE | $A_{12}$ | $A_{13}$ | $A_{14}$ | $A_{15}$ | $A_{16}$ |
|---|---|---|---|---|---|
| 1 | 1.0985E+01 | −2.0291E+00 | −3.6873E+00 | −9.4957E+00 | −1.7928E+00 |
| 2 | 1.9965E+00 | 1.3015E+00 | −7.4513E+01 | −5.4841E+01 | 1.9019E+01 |
| 3 | −3.4557E+00 | −4.3146E+00 | 2.1336E+01 | 3.9074E+01 | −3.4298E+01 |
| 4 | −1.0527E+03 | −9.7000E+02 | 4.0555E+02 | 4.2193E+03 | 3.4181E+04 |
| 5 | 1.9152E+03 | −2.6061E+04 | −2.7748E+04 | 2.8293E+05 | −2.8766E+05 |
| 6 | 2.6253E+02 | 4.7939E+02 | 1.2086E+03 | 2.6507E+03 | −9.8084E+03 |
| 7 | 8.8802E+01 | 6.8962E−01 | −6.3127E+01 | −5.2264E+02 | −8.5762E+02 |
| 8 | −2.3312E+01 | −7.5298E+01 | 2.5872E+01 | 1.1637E+01 | 2.2482E+02 |
| 11 | 0.0000E+00 | 0.0000E+00 | 0.0000E+00 | 0.0000E+00 | 0.0000E+00 |

| SURFACE | $A_{17}$ | $A_{18}$ | $A_{19}$ | $A_{20}$ |
|---|---|---|---|---|
| 1 | 1.4759E+00 | 8.7978E+00 | 1.0620E+01 | −1.2186E+01 |
| 2 | 1.0904E+02 | 2.5688E+02 | 8.1201E+02 | −1.2280E+03 |
| 3 | 1.4065E+02 | −5.1982E+02 | 3.8813E+02 | 8.4968E+01 |
| 4 | −8.0023E+03 | −9.3081E+04 | −4.4599E+04 | 1.3752E+05 |
| 5 | 7.4777E+04 | −2.4972E+05 | 4.1865E+05 | −5.5892E+05 |
| 6 | −2.4161E+04 | −2.3994E+04 | 2.0988E+05 | −1.7126E+05 |
| 7 | 1.3770E+01 | 3.5733E+03 | −2.1751E+03 | 3.9176E+02 |
| 8 | 6.1472E+02 | 1.5481E+02 | −3.5649E+03 | 2.6095E+03 |
| 11 | 0.0000E+00 | 0.0000E+00 | 0.0000E+00 | 0.0000E+00 |

TABLE 7

EXAMPLE 4
BASIC LENS DATA
f = 1.00 Fno = 1.7 YI = 0.556

| Si | Ri | Di | Ndj | vdj |
|---|---|---|---|---|
| OBJ | ∞ | 111.9691 | | |
| 1* | −2.0016 | 0.1009 | 1.58501 | 61.7 |
| 2* | 0.5787 | 0.2779 | | |
| 3* | 1.9382 | 0.4956 | 1.57421 | 41.1 |
| 4* | −1.0781 | 0.7728 | | |
| 5* | −3.1975 | 0.4024 | 1.58104 | 61.9 |
| 6* | −0.8773 | 1.6140 | | |
| 7* | 1.4241 | 0.4035 | 1.53114 | 55.4 |
| 8 | ∞ | 0.0403 | | |
| 9 | ∞ | 0.1412 | 1.52308 | 58.6 |
| 10 | ∞ | 0.0000 | | |
| IMG | ∞ | | | |

TABLE 8

EXAMPLE 4
ASPHERICAL SURFACE COEFFICIENT

| SURFACE | K | $A_3$ | $A_4$ | $A_5$ | $A_6$ |
|---|---|---|---|---|---|
| 1 | 5.0435E−02 | 1.4139E−01 | −2.7200E−02 | −1.1274E−01 | −1.0553E−01 |
| 2 | 3.2154E−03 | 7.8592E−02 | 1.3589E−02 | −1.3719E−02 | −1.8213E−02 |
| 3 | 8.9948E−02 | 2.1576E−02 | −1.0805E−01 | 1.6563E−02 | 3.5120E−01 |

TABLE 8-continued

EXAMPLE 4
ASPHERICAL SURFACE COEFFICIENT

| | | | | | |
|---|---|---|---|---|---|
| 4 | 4.7766E−02 | 4.5737E−02 | −2.3734E−02 | −8.5447E−03 | 3.3409E−01 |
| 5 | −1.1423E+02 | −5.0928E−02 | 8.2093E−02 | 1.9139E−01 | 2.8028E−01 |
| 6 | −3.9830E−02 | 6.7605E−03 | 7.6635E−02 | 1.4281E−01 | 1.9503E−01 |
| 7 | 5.1544E−02 | 0.0000E+00 | −1.7354E−02 | 0.0000E+00 | 0.0000E+00 |

| SURFACE | $A_7$ | $A_8$ | $A_9$ | $A_{10}$ | $A_{11}$ |
|---|---|---|---|---|---|
| 1 | −1.9233E−02 | 1.0842E−01 | 2.3831E−01 | 3.2002E−01 | 2.9844E−01 |
| 2 | −4.4990E−02 | −1.0215E−01 | −1.8928E−01 | −3.1578E−01 | −4.3609E−01 |
| 3 | 7.2079E−01 | 8.7087E−01 | 5.4015E−01 | −3.6295E−01 | −1.5952E+00 |
| 4 | 6.4388E−01 | 4.6059E−01 | −2.8213E−02 | −2.0188E−01 | 1.1332E−01 |
| 5 | 3.3835E−01 | 3.4920E−01 | 2.4232E−01 | 6.2150E−02 | −2.7962E−01 |
| 6 | 1.9507E−01 | 1.6863E−01 | 1.0126E−01 | 1.0264E−01 | 1.6369E−01 |
| 7 | 0.0000E+00 | 0.0000E+00 | 0.0000E+00 | 0.0000E+00 | 0.0000E+00 |

| SURFACE | $A_{12}$ | $A_{13}$ | $A_{14}$ | $A_{15}$ | $A_{16}$ |
|---|---|---|---|---|---|
| 1 | 1.7211E−01 | −1.5675E−01 | −5.5723E−01 | −1.1044E+00 | −1.3435E+00 |
| 2 | −5.3714E−01 | −5.2700E−01 | −4.2967E−01 | −1.7885E−01 | 1.9798E−01 |
| 3 | −2.6429E+00 | −3.0352E+00 | −2.6985E+00 | −1.6815E+00 | −2.3513E−01 |
| 4 | 6.3612E−01 | 1.0675E+00 | 1.0887E+00 | 6.6992E−01 | −2.5211E−01 |
| 5 | −5.5445E−01 | −8.1833E−01 | −5.6355E−01 | −1.4285E−01 | 5.6397E−01 |
| 6 | 4.9772E−01 | 8.9156E−01 | 1.3289E+00 | 1.2559E+00 | 7.2358E−01 |
| 7 | 0.0000E+00 | 0.0000E+00 | 0.0000E+00 | 0.0000E+00 | 0.0000E+00 |

| SURFACE | $A_{17}$ | $A_{18}$ | $A_{19}$ | $A_{20}$ |
|---|---|---|---|---|
| 1 | −1.3903E+00 | −4.7866E−01 | 1.2454E+00 | 3.9468E+00 |
| 2 | 6.9973E−01 | 1.3627E+00 | 1.9010E+00 | 2.1759E+00 |
| 3 | 1.4968E+00 | 3.2970E+00 | 4.9268E+00 | 6.3609E+00 |
| 4 | −1.5152E+00 | −2.9952E+00 | −4.4780E+00 | −5.4259E+00 |
| 5 | 9.1798E−01 | 8.9975E−01 | 6.8076E−02 | −2.0220E+00 |
| 6 | −5.3776E−01 | −2.2612E+00 | −4.4947E+00 | −7.3205E+00 |
| 7 | 0.0000E+00 | 0.0000E+00 | 0.0000E+00 | 0.0000E+00 |

TABLE 9

EXAMPLE 5
BASIC LENS DATA
f = 1.00 Fno = 1.7 YI = 0.580

| Si | Ri | Di | Ndj | νdj |
|---|---|---|---|---|
| OBJ | ∞ | 107.0336 | | |
| 1* | −0.5704 | 0.3624 | 1.53389 | 56.0 |
| 2* | −4.7084 | 0.1443 | | |
| 3* | 2.7052 | 0.5268 | 1.63351 | 23.6 |
| 4* | −1.3277 | 0.4340 | | |
| 5* | −0.6530 | 0.3161 | 1.63351 | 23.6 |
| 6* | 3.2391 | 0.0421 | | |
| 7* | 0.7399 | 0.5268 | 1.53389 | 56.0 |
| 8* | −0.8568 | 1.5802 | | |
| 9* | 1.4952 | 0.4214 | 1.53389 | 56.0 |
| 10 | ∞ | 0.0421 | | |
| 11 | ∞ | 0.1475 | 1.52308 | 58.6 |
| 12 | ∞ | 0.0000 | | |
| IMG | ∞ | | | |

TABLE 10

EXAMPLE 5
ASPHERICAL SURFACE COEFFICIENT

| SURFACE | K | $A_3$ | $A_4$ | $A_5$ | $A_6$ |
|---|---|---|---|---|---|
| 1 | 0.0000E+00 | −6.9584E−02 | 4.5257E+00 | −6.6832E+00 | 1.0951E−01 |
| 2 | 0.0000E+00 | −1.8962E−02 | 3.2738E+00 | −4.1575E+00 | 3.3593E−00 |
| 3 | 0.0000E+00 | −1.1185E−01 | 8.5566E−01 | −1.2298E+00 | −4.8532E+00 |
| 4 | 0.0000E+00 | −1.7964E−01 | 2.1990E+00 | −6.9366E+00 | 1.7160E+00 |
| 5 | 0.0000E+00 | −2.0654E−01 | 7.1876E+00 | −1.9522E+01 | 4.2954E+00 |
| 6 | 0.0000E+00 | −9.4168E−02 | 1.9635E+00 | −2.6073E+00 | −1.0572E+01 |
| 7 | 0.0000E+00 | −1.4146E−01 | 3.0825E−01 | −9.2017E+00 | 1.9195E+01 |
| 8 | 0.0000E+00 | 4.1401E−02 | −5.1101E−01 | 1.2539E+00 | 7.3307E−01 |
| 9 | −8.3125E−02 | 0.0000E+00 | 1.4545E−02 | 0.0000E+00 | 0.0000E+00 |

| SURFACE | $A_7$ | $A_8$ | $A_9$ | $A_{10}$ | $A_{11}$ |
|---|---|---|---|---|---|
| 1 | 4.3919E+00 | 4.7384E+00 | −4.5634E+00 | −1.0519E+01 | −3.4560E+00 |
| 2 | −2.9727E+00 | −5.6278E+00 | 1.3820E+01 | 4.0903E+01 | 1.8922E+01 |

TABLE 10-continued

EXAMPLE 5
ASPHERICAL SURFACE COEFFICIENT

| | | | | | |
|---|---|---|---|---|---|
| 3 | 1.3715E+01 | 1.2008E+01 | −2.2228E+01 | −2.4671E+01 | −9.5568E+00 |
| 4 | 4.7631E+01 | −1.4445E+01 | −2.4968E+02 | −1.2902E+02 | 8.3329E+02 |
| 5 | 1.4693E+02 | −2.8609E+02 | −4.1942E+02 | 3.1326E+02 | 3.3784E+03 |
| 6 | 1.5162E+01 | 3.2870E+01 | −1.2010E+01 | 2.6229E+01 | 5.0531E+01 |
| 7 | 2.2816E+00 | −1.3292E+01 | −4.9838E+01 | 3.6145E+01 | 4.9264E+01 |
| 8 | −7.3582E+00 | −5.2324E+00 | 1.4493E+01 | 5.3223E+01 | 3.1313E+01 |
| 9 | 0.0000E+00 | 0.0000E+00 | 0.0000E+00 | 0.0000E+00 | 0.0000E+00 |

| SURFACE | $A_{12}$ | $A_{13}$ | $A_{14}$ | $A_{15}$ | $A_{16}$ |
|---|---|---|---|---|---|
| 1 | 2.1339E+01 | 4.5836E+00 | −1.3860E+01 | −2.8313E+00 | 1.9219E+00 |
| 2 | −1.0914E+02 | −1.7562E+02 | −1.2283E+02 | 3.2921E+02 | 6.0658E+02 |
| 3 | 6.3496E+01 | 5.3931E+01 | −1.0409E+02 | −2.3959E+01 | −1.2742E+02 |
| 4 | 2.2030E+03 | −8.8354E+03 | −1.0162E+04 | −1.7459E+04 | 5.6657E+04 |
| 5 | 1.0618E+04 | −4.4986E+04 | −8.0947E+04 | 4.7916E+05 | −6.3922E+05 |
| 6 | −9.5554E+02 | −2.0835E+03 | 2.0203E+03 | 1.6951E+04 | 8.5121E+03 |
| 7 | 1.0164E+02 | −1.6304E+02 | −2.3684E+02 | 2.9903E+02 | −4.6855E+02 |
| 8 | −1.4418E+02 | −2.5607E+02 | 2.5626E+01 | 2.2177E+02 | 4.7799E+02 |
| 9 | 0.0000E+00 | 0.0000E+00 | 0.0000E+00 | 0.0000E+00 | 0.0000E+00 |

| SURFACE | $A_{17}$ | $A_{18}$ | $A_{19}$ | $A_{20}$ |
|---|---|---|---|---|
| 1 | −6.9700E+00 | 1.1837E+00 | 1.5381E+01 | −8.5650E+00 |
| 2 | 3.8921E+01 | −1.0736E+03 | 1.5407E+02 | 2.8389E+02 |
| 3 | 3.3589E+02 | −6.5428E+02 | 1.3090E+03 | −8.5624E+02 |
| 4 | 2.4903E+04 | −9.4788E+04 | −4.4737E+03 | 4.7562E+04 |
| 5 | 3.6588E+05 | −5.8137E+05 | 1.0453E+06 | −5.7846E+05 |
| 6 | −4.7177E+04 | −1.3379E+05 | 3.3360E+05 | −1.8162E+05 |
| 7 | 5.6112E+02 | 6.0489E+03 | −1.4003E+04 | 8.0931E+03 |
| 8 | 1.4546E+03 | 1.5656E+02 | −6.9538E+03 | 5.0376E+03 |
| 9 | 0.0000E+00 | 0.0000E+00 | 0.0000E+00 | 0.0000E+00 |

TABLE 11

EXAMPLE 6
BASIC LENS DATA
f = 1.00 Fno = 1.7 YI = 0.584

| Si | Ri | Di | Ndj | νdj |
|---|---|---|---|---|
| OBJ | ∞ | 107.7114 | | |
| 1* | −1.4320 | 0.1060 | 1.53389 | 56.0 |
| 2* | 0.5280 | 0.2847 | | |
| 3* | 0.9984 | 0.2633 | 1.58312 | 30.2 |
| 4* | −2.7953 | 0.4800 | | |
| 5 | −4.7972 | 0.3142 | 1.83501 | 44.5 |
| 6 | −0.9401 | 0.0424 | | |
| 7 | −0.9817 | 0.1060 | 1.82271 | 23.9 |
| 8 | 3.6890 | 0.0424 | | |
| 9* | 1.8863 | 0.4898 | 1.53389 | 56.0 |
| 10* | −0.8502 | 1.6962 | | |
| 11* | 1.4967 | 0.4241 | 1.53114 | 55.4 |
| 12 | ∞ | 0.0424 | | |
| 13 | ∞ | 0.1484 | 1.52308 | 58.6 |
| 14 | ∞ | 0.0000 | | |
| IMG | ∞ | | | |

TABLE 12

EXAMPLE 6
ASPHERICAL SURFACE COEFFICIENT

| SURFACE | K | $A_3$ | $A_4$ | $A_5$ | $A_6$ |
|---|---|---|---|---|---|
| 1 | 0.0000E+00 | 1.3206E−01 | 3.0753E−02 | −5.0061E−01 | 3.1247E−01 |
| 2 | 0.0000E+00 | 1.2406E−01 | −3.6044E−01 | −5.7254E−01 | −1.5116E+00 |
| 3 | 0.0000E+00 | −2.9339E−03 | 1.8753E+00 | 3.0068E−01 | −3.8426E−01 |
| 4 | 0.0000E+00 | −3.8254E−02 | 7.0447E−01 | 3.3887E−02 | −2.2136E−01 |
| 9 | 0.0000E+00 | −6.4998E−02 | 2.2922E−01 | −7.5240E−01 | 3.3056E−01 |
| 10 | 0.0000E+00 | 2.3412E−02 | −2.5927E−01 | 7.6530E−01 | −1.0116E+00 |
| 11 | −2.5398E−01 | 0.0000E+00 | −3.3756E−02 | 0.0000E+00 | 0.0000E+00 |

| SURFACE | $A_7$ | $A_8$ | $A_9$ | $A_{10}$ | $A_{11}$ |
|---|---|---|---|---|---|
| 1 | 4.6334E−01 | 5.8156E−01 | 2.6439E−01 | −2.2947E−01 | −1.3865E+00 |
| 2 | 1.1620E+00 | 2.2660E+00 | 1.3792E+00 | 2.3638E−04 | −7.7699E−01 |
| 3 | 2.4451E−01 | 3.9222E−01 | −5.9686E−01 | −8.9912E−01 | −2.0618E+00 |
| 4 | 9.0904E−01 | 2.6638E+00 | 1.9889E+00 | −2.0771E+00 | −3.9098E+00 |
| 9 | 8.6944E−01 | −1.4172E−01 | −1.0441E+00 | −1.0649E+00 | 1.2708E−01 |

TABLE 12-continued

EXAMPLE 6
ASPHERICAL SURFACE COEFFICIENT

| | | | | | |
|---|---|---|---|---|---|
| 10 | 1.9895E−01 | 4.4620E−02 | 4.7774E−02 | −2.3448E−01 | 5.1079E−01 |
| 11 | 0.0000E+00 | 0.0000E+00 | 0.0000E+00 | 0.0000E+00 | 0.0000E+00 |

| SURFACE | $A_{12}$ | $A_{13}$ | $A_{14}$ | $A_{15}$ | $A_{16}$ |
|---|---|---|---|---|---|
| 1 | −1.5463E+00 | 5.4281E−03 | 8.8270E−01 | −2.1635E−01 | 1.2682E+00 |
| 2 | −2.0837E+00 | −1.8850E+00 | −2.1697E+00 | −1.5354E+00 | −1.2963E−01 |
| 3 | −1.0414E+00 | −9.5783E−01 | 5.9621E−01 | 1.1103E+00 | 3.2552E+00 |
| 4 | −4.6206E+00 | −3.6804E+00 | −2.4795E+00 | −7.0436E−01 | 1.2268E+00 |
| 9 | 1.7854E+00 | 1.8824E+00 | 1.5573E+00 | 1.3351E+00 | −6.0261E−02 |
| 10 | 6.8805E−01 | 8.7346E−01 | 5.5944E−01 | −2.4756E−02 | −1.4744E+00 |
| 11 | 0.0000E+00 | 0.0000E+00 | 0.0000E+00 | 0.0000E+00 | 0.0000E+00 |

| SURFACE | $A_{17}$ | $A_{18}$ | $A_{19}$ | $A_{20}$ |
|---|---|---|---|---|
| 1 | −3.2188E+00 | −8.6569E−01 | 5.3779E+00 | 1.8630E+00 |
| 2 | 1.8619E+00 | −5.0636E−01 | 6.1544E+00 | −1.0695E+00 |
| 3 | 2.8098E+00 | 2.4917E+00 | 5.1348E−01 | −4.6167E+00 |
| 4 | 3.2350E+00 | 4.5047E+00 | 4.8395E+00 | 5.2234E+00 |
| 9 | −1.2463E+00 | −3.8005E+00 | −4.4070E+00 | 1.1493E+00 |
| 10 | −1.0095E+00 | −8.4202E−01 | 1.4651E−01 | 2.1899E+00 |
| 11 | 0.0000E+00 | 0.0000E+00 | 0.0000E+00 | 0.0000E+00 |

Values of projection lenses of Examples 1 to 6 corresponding to the conditional expressions (1) to (9) are shown in Table 13. Examples 1 to 6 use d-line as the reference wavelength and Table 13 indicates values at the reference wavelength.

TABLE 13

| | EXAMPLE 1 | EXAMPLE 2 | EXAMPLE 3 | EXAMPLE 4 | EXAMPLE 5 | EXAMPLE 6 |
|---|---|---|---|---|---|---|
| Bf/f | 0.13 | 0.14 | 0.13 | 0.13 | 0.12 | 0.13 |
| d34/f | 1.58 | 1.21 | 1.31 | 1.61 | 1.58 | 1.70 |
| YI/f | 0.54 | 0.56 | 0.61 | 0.56 | 0.58 | 0.58 |
| f × d34/ (YI × YA) | 6.26 | 5.55 | 5.07 | 4.95 | 4.66 | 4.65 |
| f × YP/ (YI × YA) | 2.14 | 2.57 | 2.35 | 1.71 | 1.71 | 1.60 |
| d13/YI | 3.64 | 3.36 | 3.41 | 3.69 | 4.05 | 3.64 |
| \|f1\|/f | 1.05 | 0.56 | 1.07 | 0.75 | 1.25 | 0.71 |
| f2/f | 1.18 | 0.77 | 0.93 | 1.28 | 1.47 | 1.28 |
| f4/f | 2.70 | 2.69 | 2.92 | 2.67 | 2.79 | 2.81 |

FIG. 12 shows aberration diagrams of the projection lens of Example 1, in which diagrams A to D illustrate spherical aberration, astigmatism, distortion, and lateral chromatic aberration respectively. Note that the aberration diagrams in FIG. 12 are those obtained when the magnification side conjugate position is set to the value shown in Table 1.

The spherical aberration diagram illustrates aberrations with respect to d-line (wavelength of 587.6 nm), F-line (wavelength of 486.1 nm), and C-line (wavelength of 656.3 nm). The astigmatism diagram illustrates aberrations in the saggital and tangential directions by a solid line and a dashed line respectively. The distortion diagram illustrates aberration with respect to d-line by a solid line. The lateral chromatic aberration diagram illustrates aberrations with respect to F-line and C-line. The symbol F on the upper side of the vertical axis of the spherical aberration diagram indicates a F-value, and the symbol ω on the upper side of the vertical axis of each of the other diagrams indicates a half angle of view.

Likewise, aberration diagrams A to D of the projection lenses of Examples 2 to 6 are shown in FIGS. 13, 14, 15, 16, and 17 respectively. These aberration diagrams are those obtained when the magnification side conjugate positions are set to the values shown in the basic lens data of the respective Examples. It is known from each aberration diagram that each aberration is satisfactorily corrected for the projection lenses of Examples 1 to 6.

So far the present invention has been described by way of the embodiments and Examples, but it should be understood that the present invention is not limited to the embodiments and Examples described above, and various changes and modifications may be made. For example, values of radius of curvature of each lens, surface distance, refractive index, Abbe number, aspherical surface coefficient and the like of the projection lens of the present invention may be changed as appropriate. Further, the light valve, optical member used for luminous flux separation or luminous flux combining are not limited to the compositions described above, and various changes and modifications may be made to the embodiments.

What is claimed is:

1. A projection lens for projecting image information displayed on a reduction side conjugate position to a magnification side conjugate position, the projection lens comprising:

a first lens group having a negative power, a second lens group having a positive power, a third lens group having a positive power, and a fourth lens group having a positive power arranged in this order from the magnification side, wherein the projection lens satisfies conditional expressions (1), (2-1), (3), and (5) given below:

$$Bf/f \leq 1.0 \quad (1);$$

$$0.7 \leq d34/f \leq 2.0 \quad (2\text{-}1);$$

$$0.5 \leq YI/f \quad (3); \text{ and}$$

$$f \times YP/(YI \times YA) \leq 3.0 \quad (5),$$

where:
- Bf is a back focus on the reduction side (air equivalent length);
- f is a focal length of the entire projection lens, including said first, second, third, and fourth lens groups;
- d34 is an air equivalent distance on the optical axis between the third lens group and fourth lens group;
- YI is a maximum height of effective luminous flux at the reduction side conjugate position;
- YP is a maximum height of an off-axis principal ray in the projection lens; and
- YA is a maximum height of axial luminous flux in the projection lens;

wherein said projection lens comprises a total of six or fewer lenses.

2. The projection lens of claim 1, wherein the projection lens satisfies a conditional expression (2-2) given below:

$$1.0 \leq d34/f \leq 2.0 \quad (2\text{-}2).$$

3. The projection lens of claim 1, wherein the projection lens satisfies a conditional expression (4) given below:

$$f \times d34/(YI \times YA) \leq 12.5 \quad (4).$$

4. The projection lens of claim 1, wherein the projection lens satisfies a conditional expression (6) given below:

$$d13/YI \leq 7.5 \quad (6),$$

where d13 is a distance on the optical axis from the surface of the first lens group on the most magnification side to the surface of the third lens group on the most reduction side.

5. The projection lens of claim 1, wherein the projection lens satisfies a conditional expression (7) given below:

$$0.5 \leq |f1|/f \leq 2.5 \quad (7),$$

where f1 is a focal length of the first lens group.

6. The projection lens of claim 1, wherein the projection lens satisfies a conditional expression (8) given below:

$$0.5 \leq f2/f \leq 5.0 \quad (8),$$

where f2 is a focal length of the second lens group.

7. The projection lens of claim 1, wherein the projection lens satisfies a conditional expression (9) given below:

$$1.5 \leq f4/f \leq 5.0 \quad (9)$$

where f4 is a focal length of the fourth lens group.

8. The projection lens of claim 1, wherein the first lens group is composed of one negative lens.

9. The projection lens of claim 1, wherein the first lens group has at least one aspherical surface.

10. The projection lens of claim 1, wherein the second lens group is composed of one positive lens.

11. The projection lens of claim 1, wherein the second lens group has at least one aspherical surface.

12. The projection lens of claim 1, wherein the third lens group is composed of less than or equal to three lenses.

13. The projection lens of claim 1, wherein the third lens group has at least one aspherical surface.

14. The projection lens of claim 1, wherein the fourth lens group is composed of one positive lens.

15. The projection lens of claim 1, wherein the fourth lens group has at least one aspherical surface.

16. The projection lens of claim 1, wherein a lens disposed on the most magnification side has a non-circular shape which includes an effective luminous flux passing area.

17. The projection lens of claim 1, wherein a lens disposed on the most reduction side has a non-circular shape which includes an effective luminous flux passing area.

18. The projection lens of claim 1, wherein the reduction side of the projection lens is telecentric.

19. A projection display apparatus, comprising a light source, at least one light valve, an illumination optical unit for guiding luminous flux from the light source to the light valve, and the projection lens of claim 1, wherein the luminous flux from the light source is optically modulated by the light valve and projected to a screen by the projection lens.

* * * * *